Feb. 13, 1968 R. D. LIVINGSTON 3,368,766
AUTOMATIC BOBBIN HANDLING AND SPOOLER LOADING MECHANISM
Filed Aug. 6, 1965 21 Sheets-Sheet 1
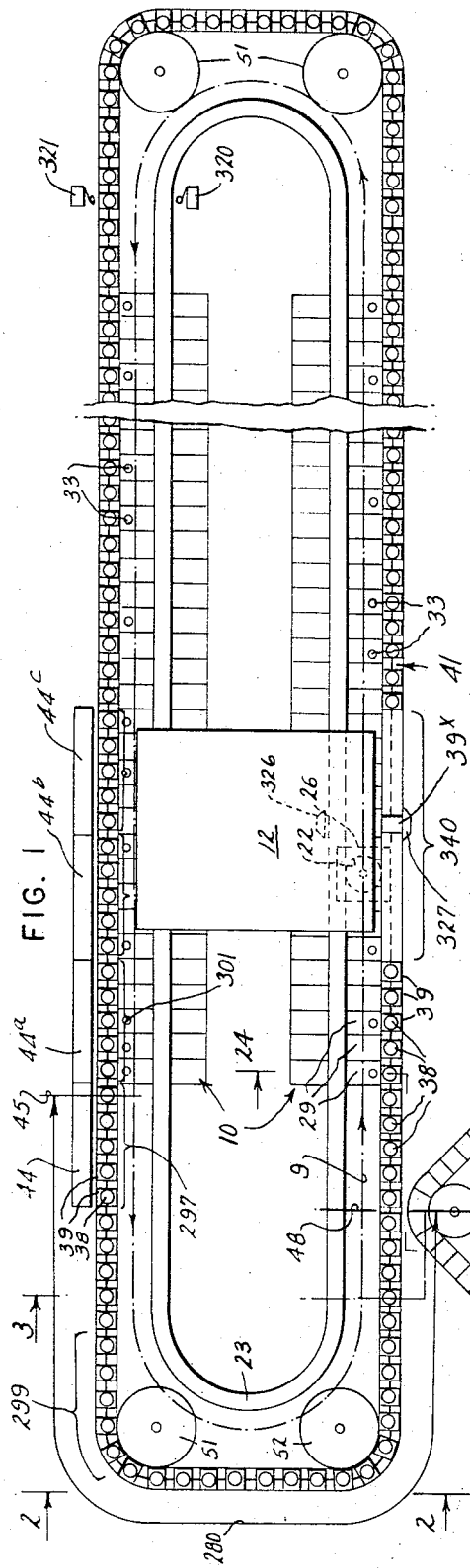
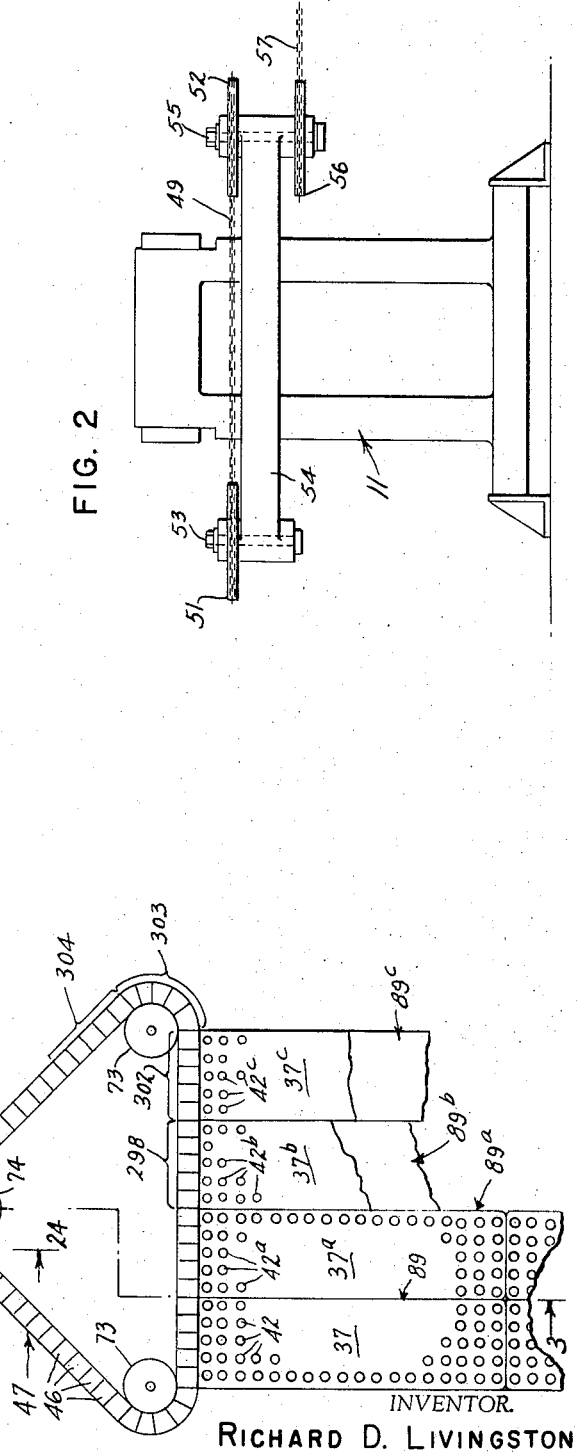
INVENTOR.
RICHARD D. LIVINGSTON
BY Wolfe, Hubbard, Voit & Osann
ATTORNEYS INVENTOR.
RICHARD D. LIVINGSTON
BY
Wolfe, Hubbard, Voit & Osann
ATTORNEYS

INVENTOR.
RICHARD D. LIVINGSTON

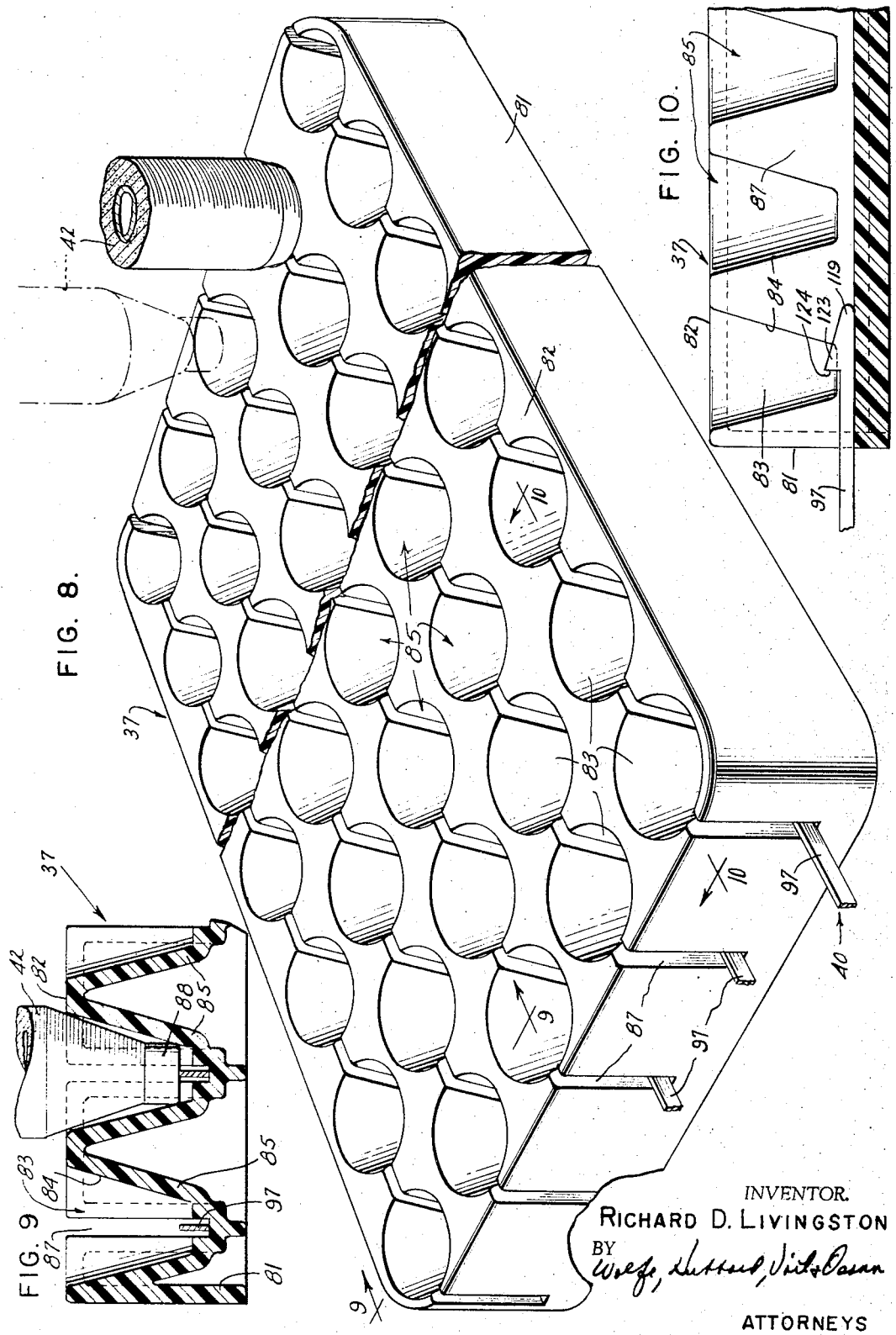

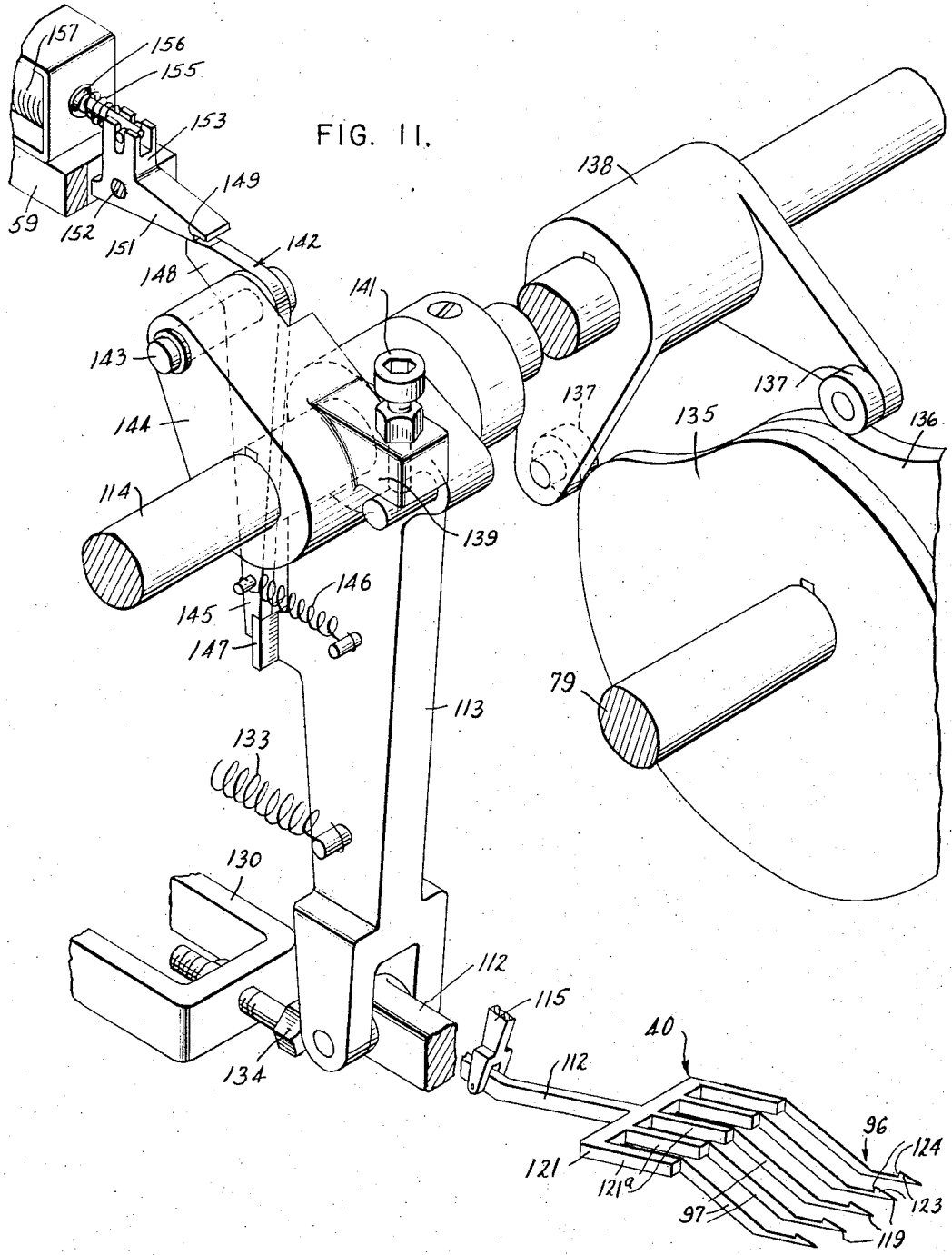

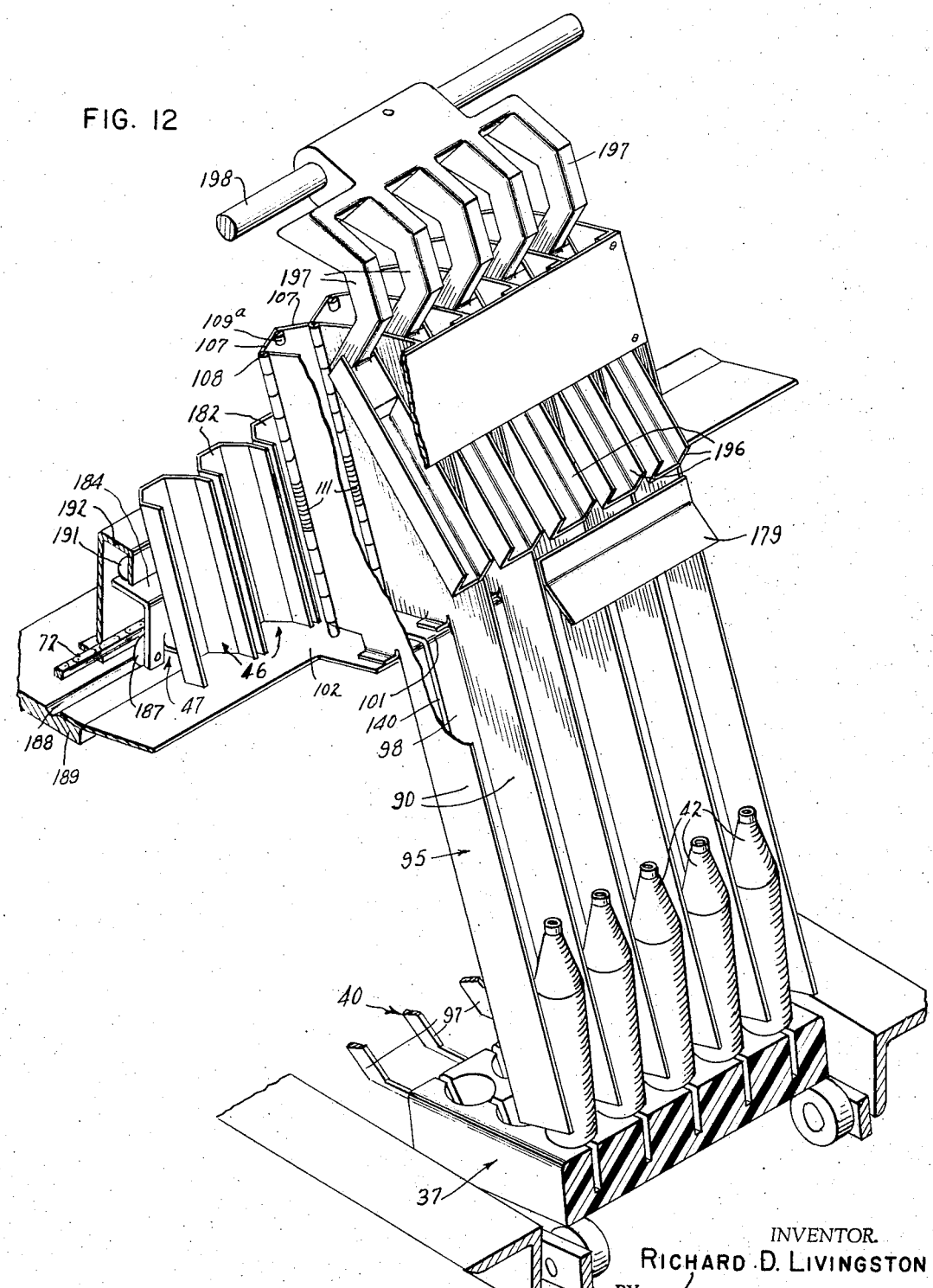

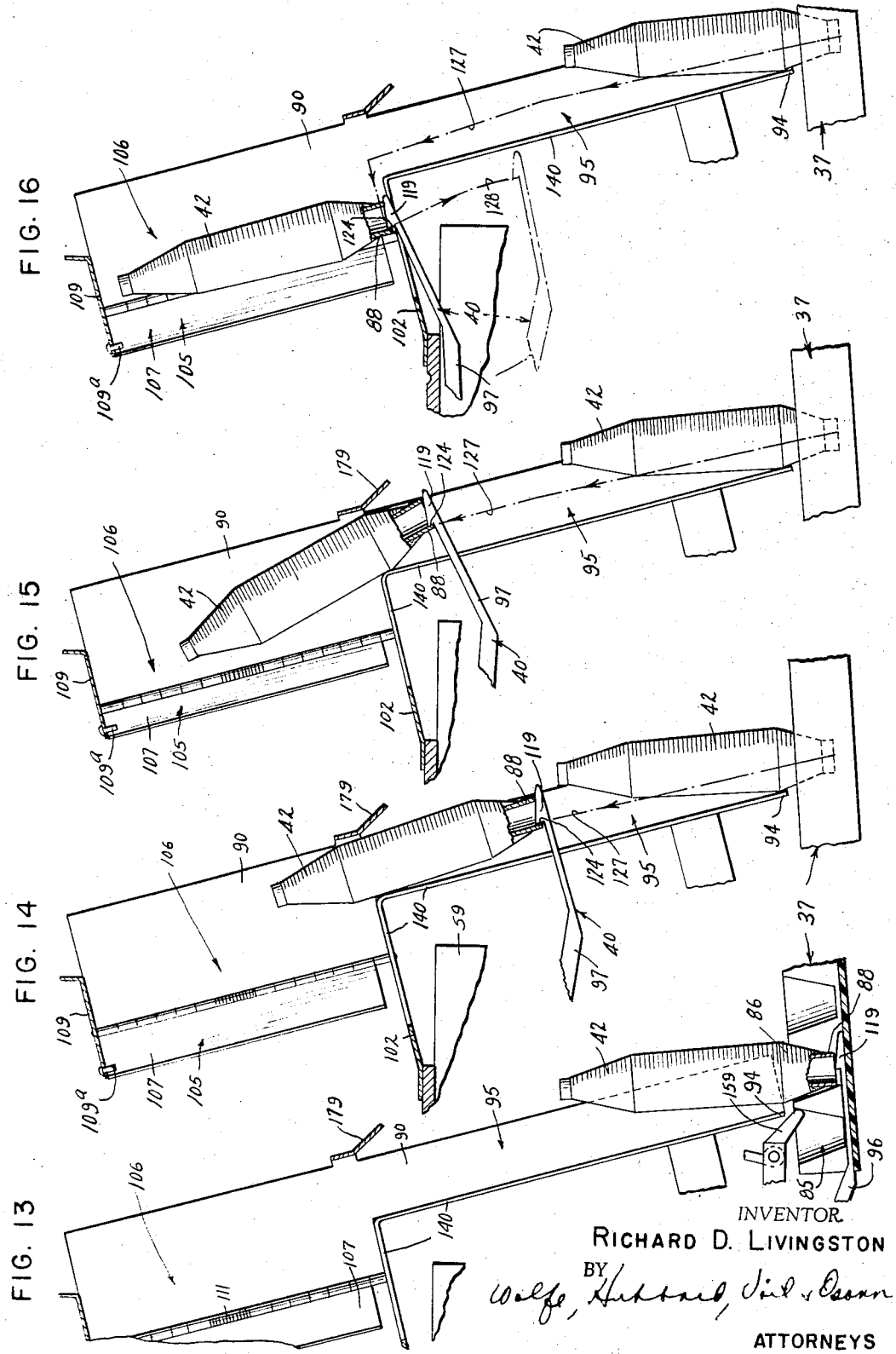

INVENTOR.
RICHARD D. LIVINGSTON
BY Wolfe, Hubbard, Voit & Osann
ATTORNEYS

Feb. 13, 1968   R. D. LIVINGSTON   3,368,766
AUTOMATIC BOBBIN HANDLING AND SPOOLER LOADING MECHANISM
Filed Aug. 6, 1965   21 Sheets-Sheet 12

INVENTOR.
RICHARD D. LIVINGSTON
BY
ATTORNEYS

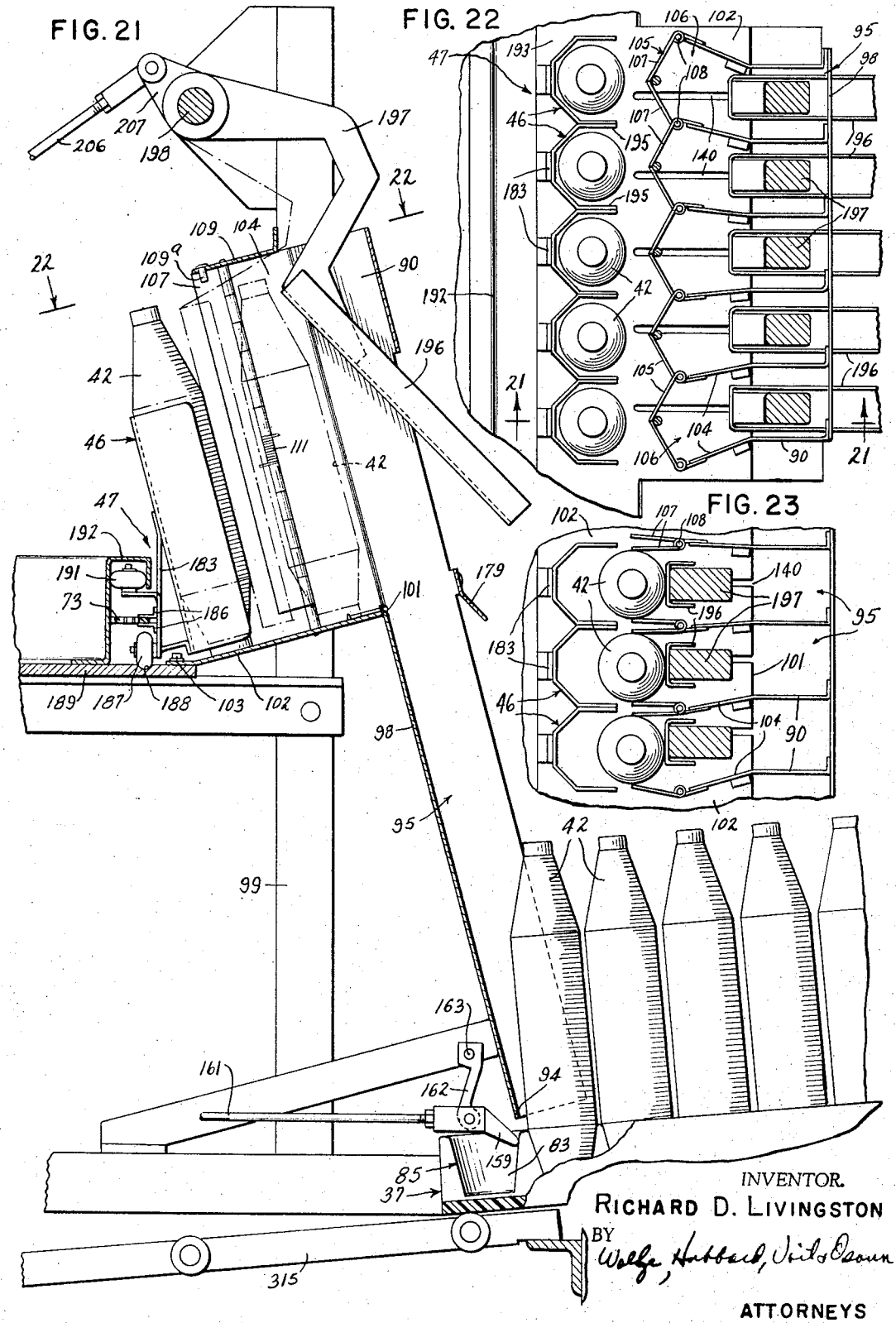

Feb. 13, 1968  R. D. LIVINGSTON  3,368,766
AUTOMATIC BOBBIN HANDLING AND SPOOLER LOADING MECHANISM
Filed Aug. 6, 1965  21 Sheets-Sheet 14

INVENTOR.
RICHARD D. LIVINGSTON
BY
ATTORNEYS

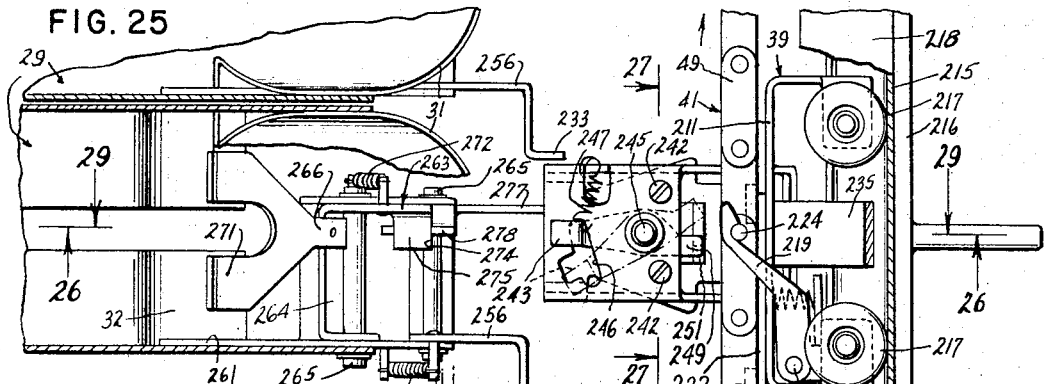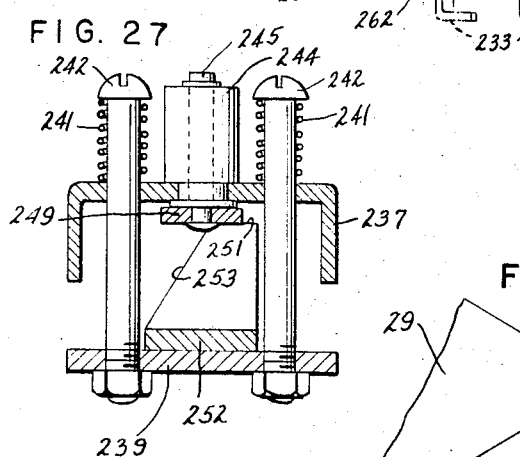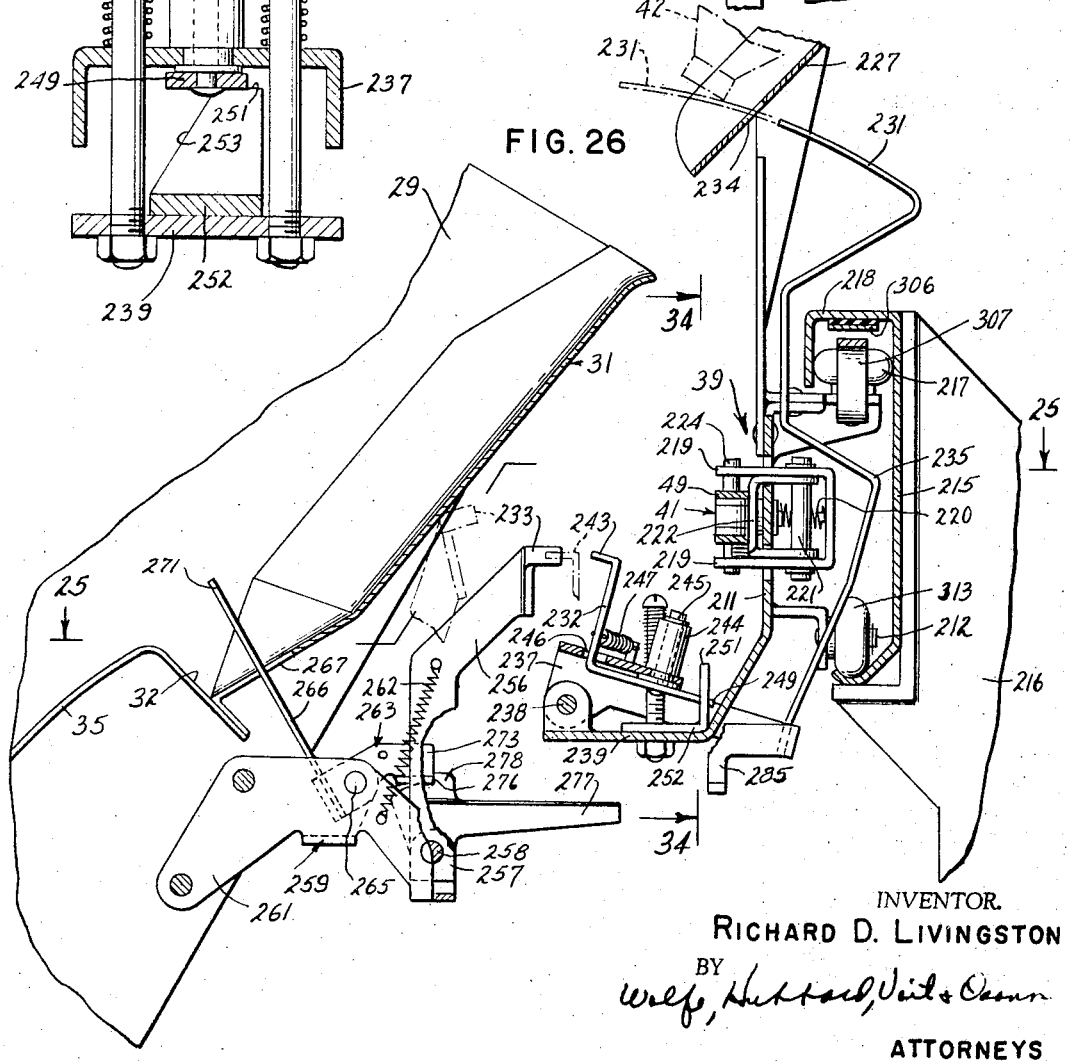

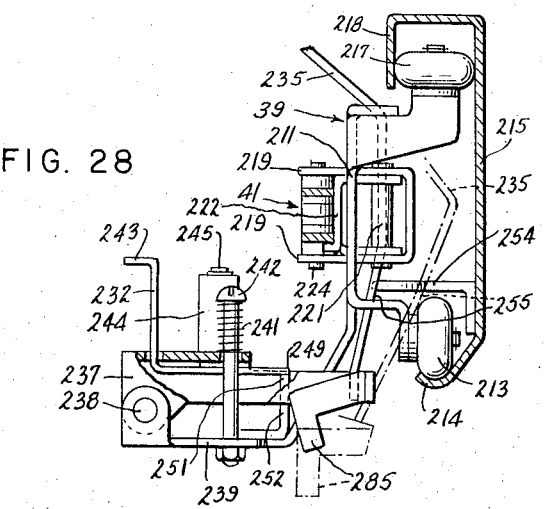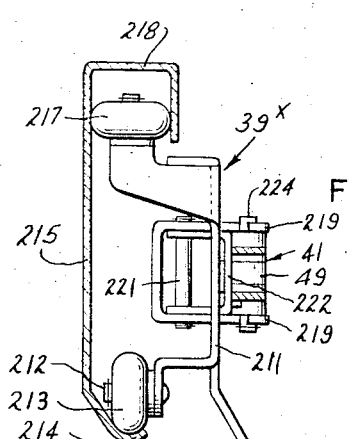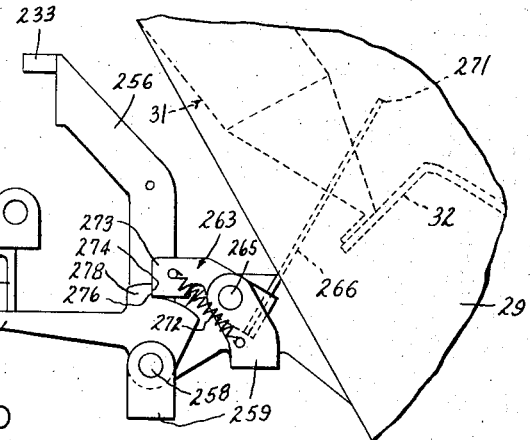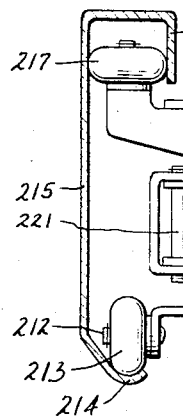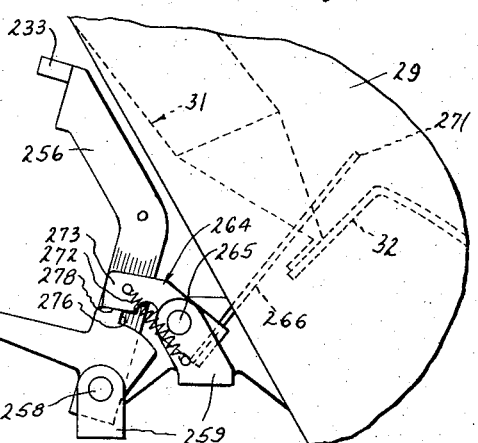

Feb. 13, 1968  R. D. LIVINGSTON  3,368,766
AUTOMATIC BOBBIN HANDLING AND SPOOLER LOADING MECHANISM
Filed Aug. 6, 1965  21 Sheets-Sheet 17
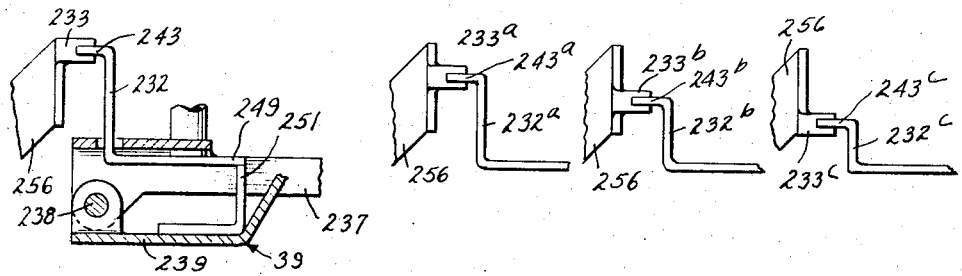
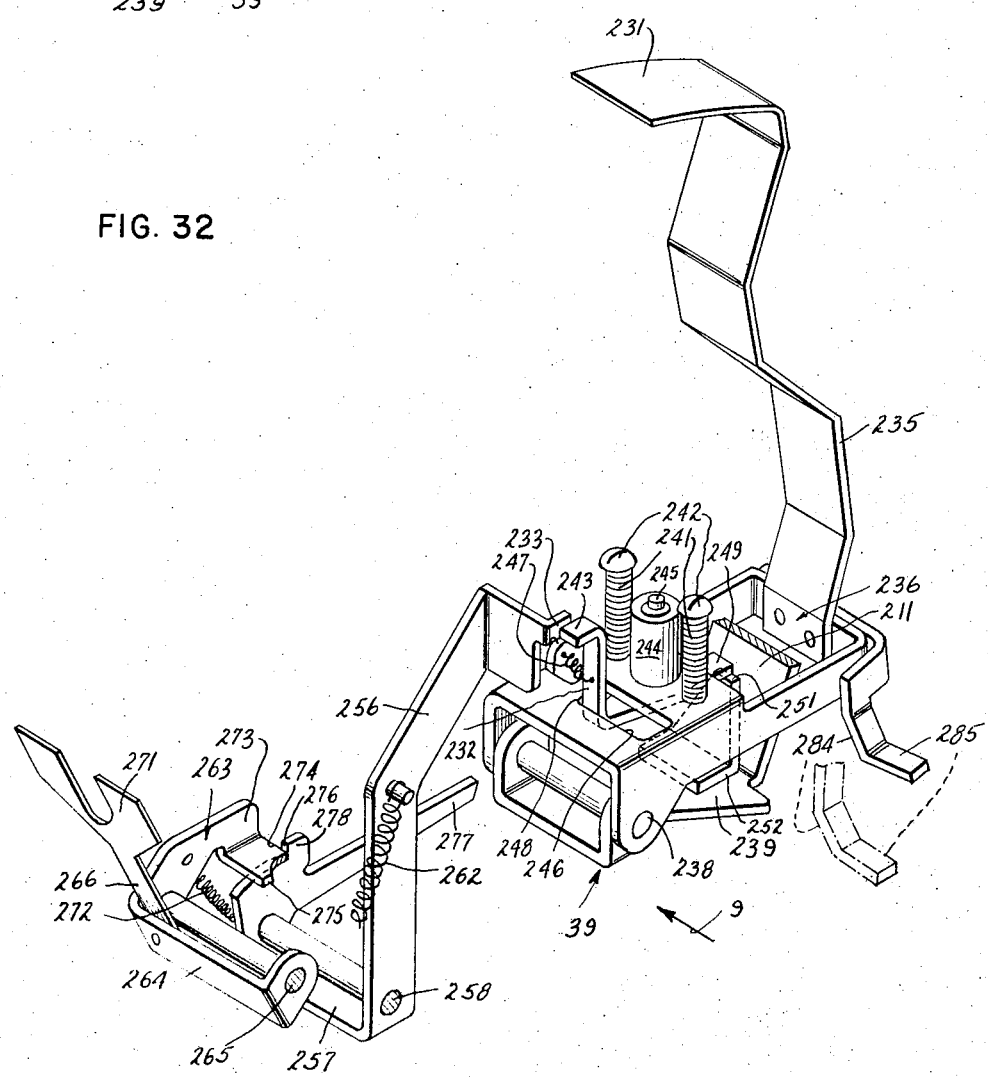
INVENTOR.
RICHARD D. LIVINGSTON
BY
ATTORNEYS Feb. 13, 1968 R. D. LIVINGSTON 3,368,766
AUTOMATIC BOBBIN HANDLING AND SPOOLER LOADING MECHANISM
Filed Aug. 6, 1965 21 Sheets-Sheet 18
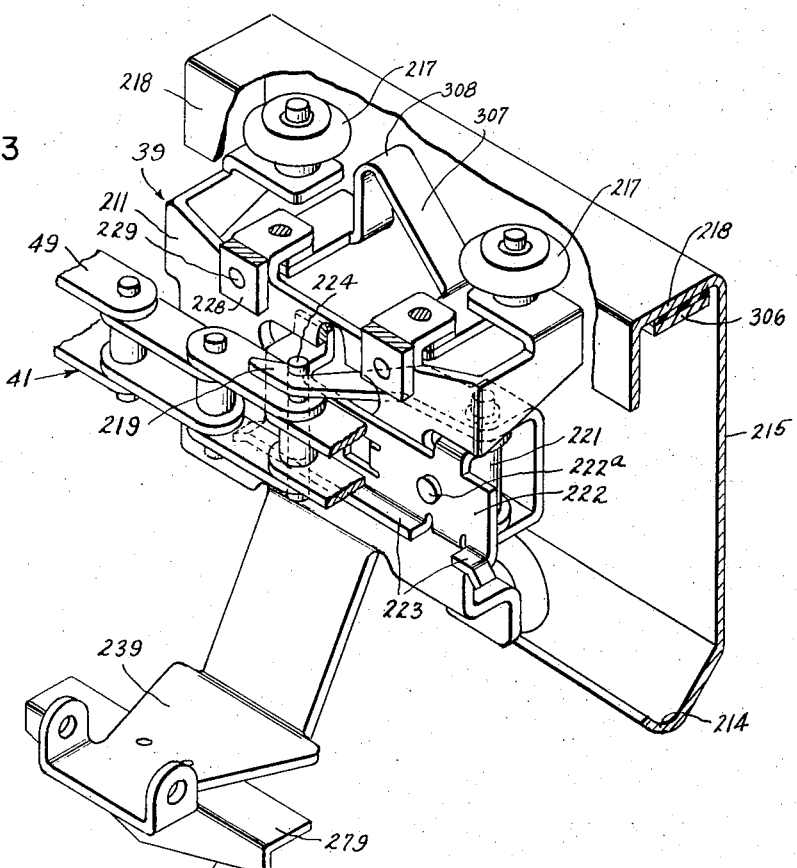
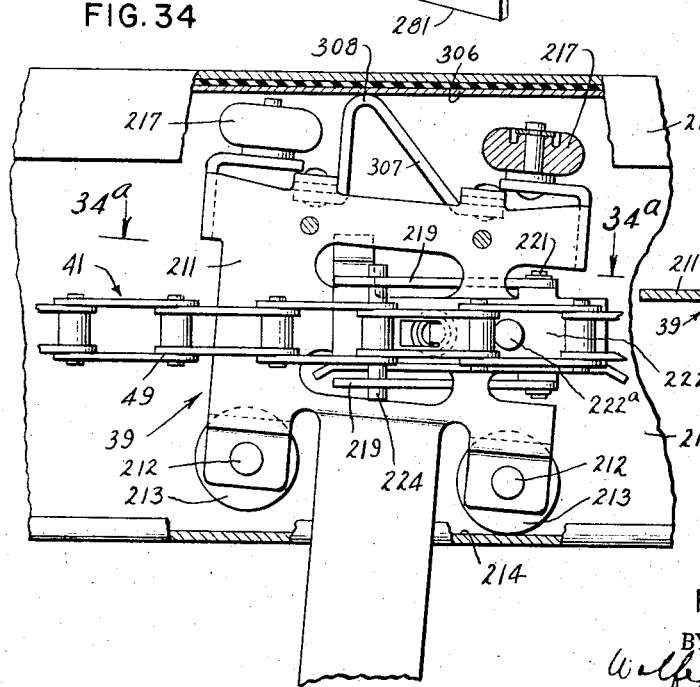
INVENTOR.
RICHARD D. LIVINGSTON
ATTORNEYS Feb. 13, 1968 R. D. LIVINGSTON 3,368,766
AUTOMATIC BOBBIN HANDLING AND SPOOLER LOADING MECHANISM
Filed Aug. 6, 1965 21 Sheets-Sheet 19
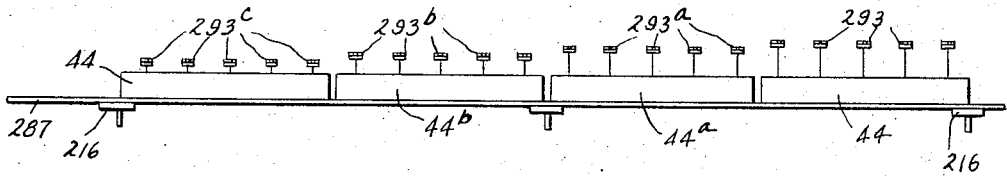
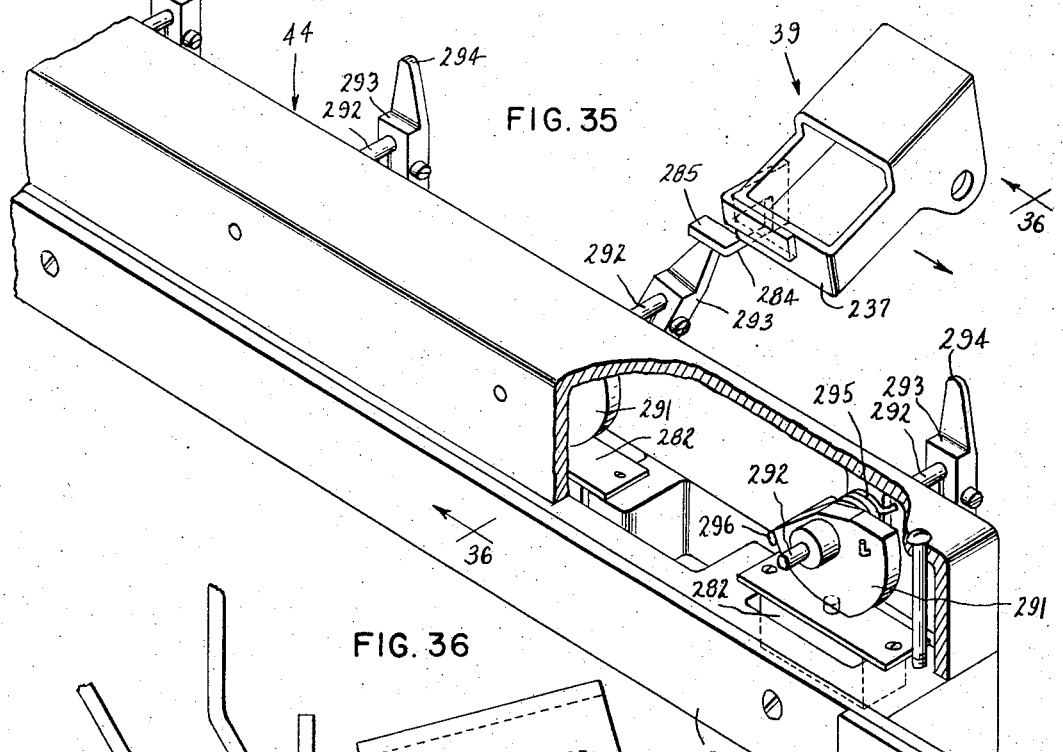
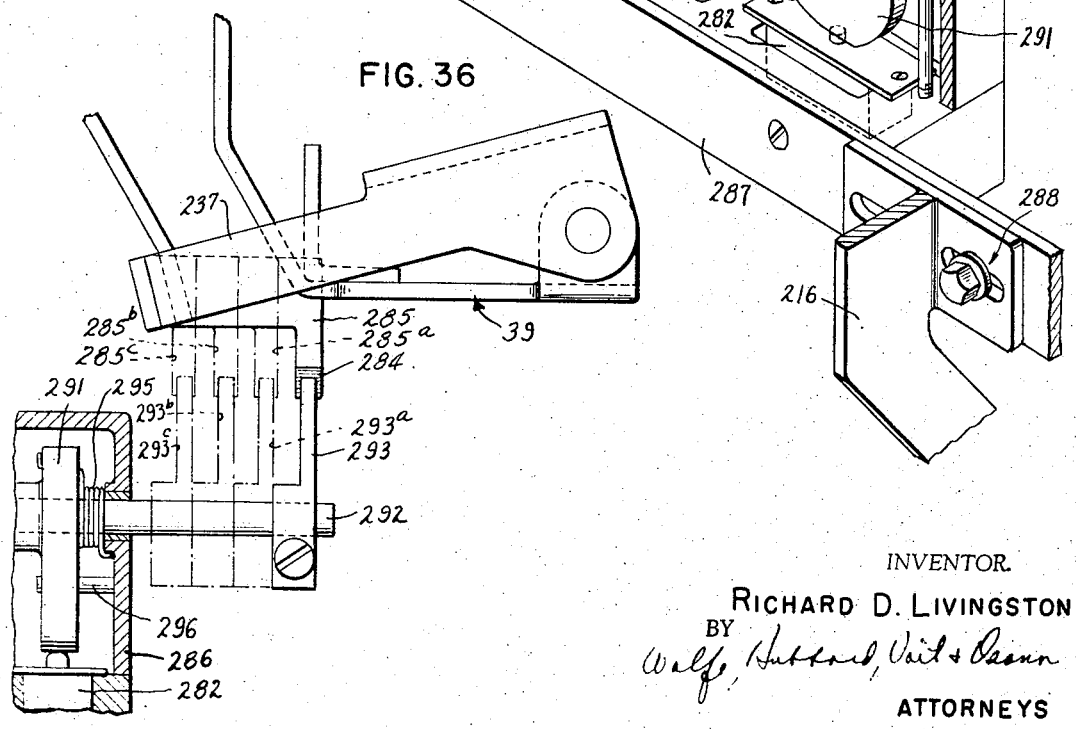
INVENTOR.
RICHARD D. LIVINGSTON
BY
ATTORNEYS Feb. 13, 1968  R. D. LIVINGSTON  3,368,766
AUTOMATIC BOBBIN HANDLING AND SPOOLER LOADING MECHANISM
Filed Aug. 6, 1965  21 Sheets-Sheet 20
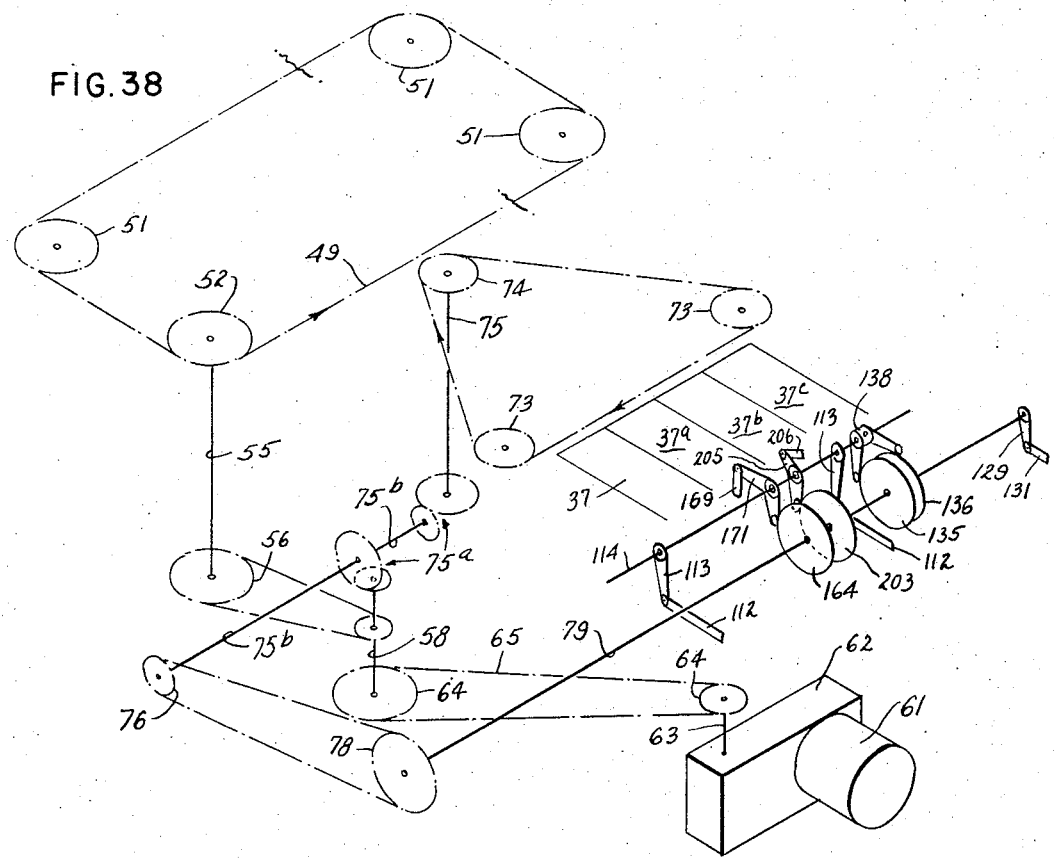
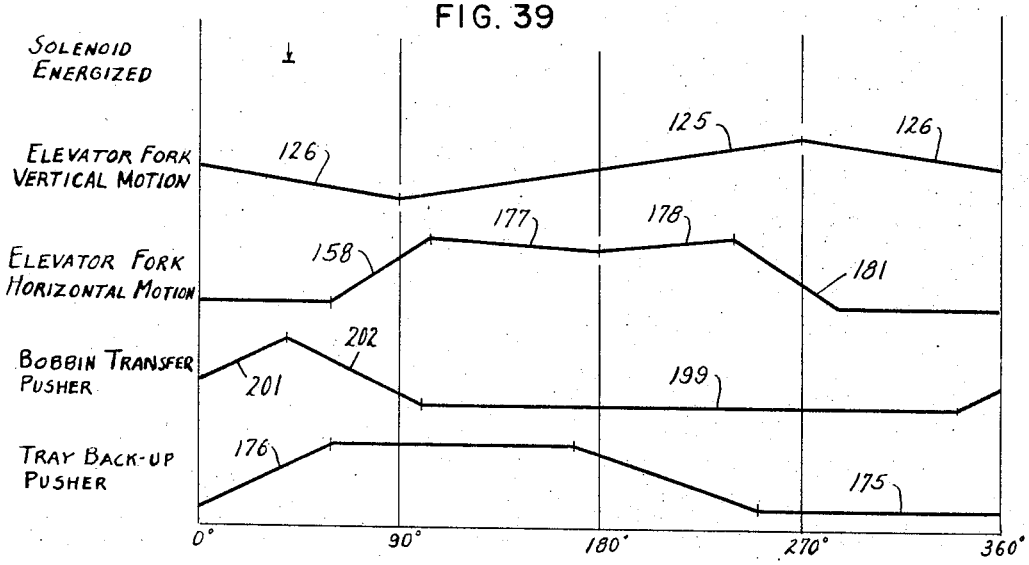
INVENTOR.
RICHARD D. LIVINGSTON
BY
ATTORNEYS Feb. 13, 1968   R. D. LIVINGSTON   3,368,766
AUTOMATIC BOBBIN HANDLING AND SPOOLER LOADING MECHANISM
Filed Aug. 6, 1965   21 Sheets-Sheet 21
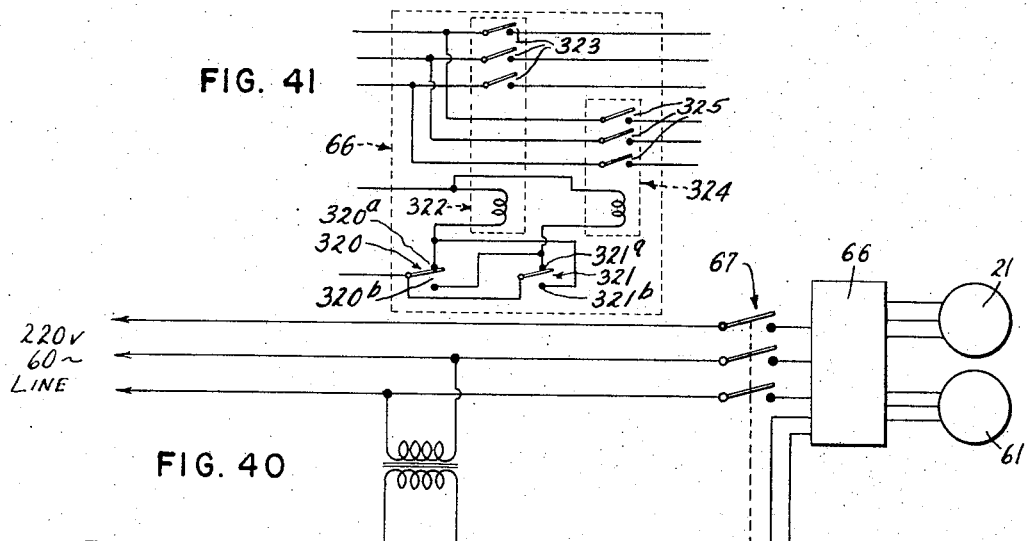
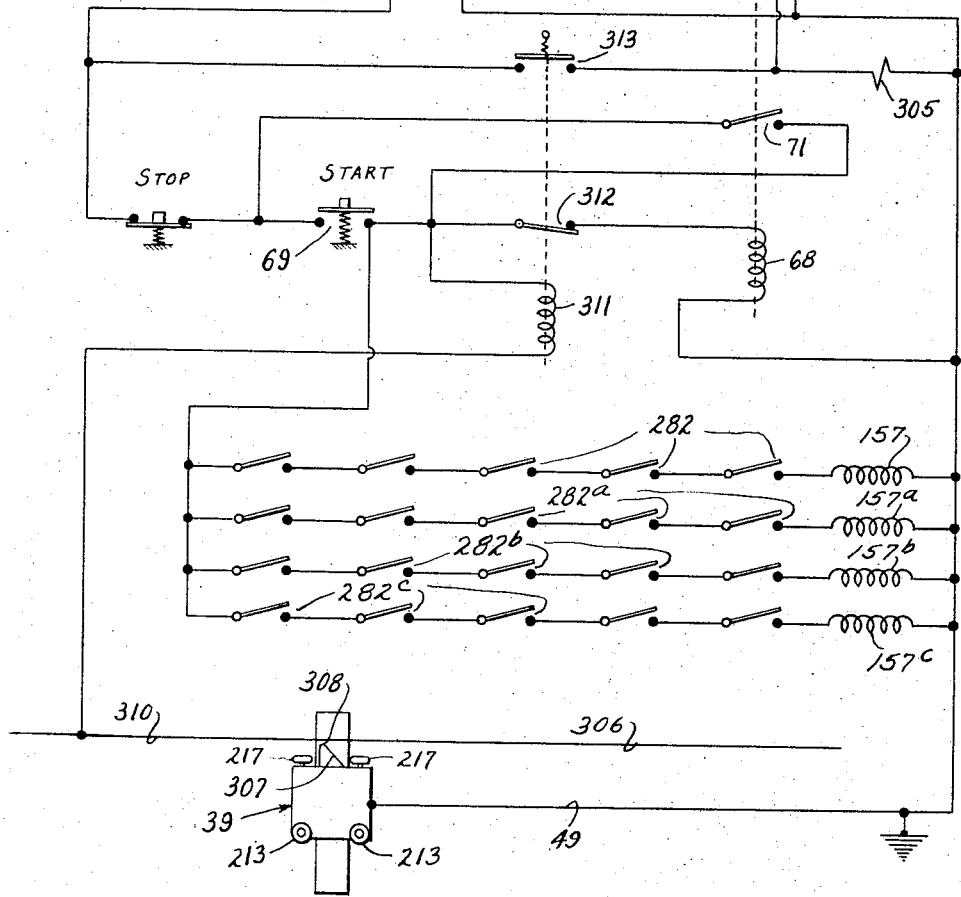
INVENTOR.
RICHARD D. LIVINGSTON
BY
Wolfe, Hubbard, Voit & Osann
ATTORNEYS

United States Patent Office 3,368,766
Patented Feb. 13, 1968

3,368,766
AUTOMATIC BOBBIN HANDLING AND SPOOLER LOADING MECHANISM
Richard D. Livingston, Rockford, Ill., assignor to Barber-Colman Company, Rockford, Ill., a corporation of Illinois
Filed Aug. 6, 1965, Ser. No. 477,864
62 Claims. (Cl. 242—35.5)

ABSTRACT OF THE DISCLOSURE

This addition to a conventional Barber-Colman multiple unit thread winder or so-called spooler operates entirely automatically to pick up rows or groups of filled bobbins 42 supported in a tray 37 (FIGS. 1, 3, 8 to 11), transfer successive groups as needed into successive empty holders 38 (FIGS. 18, 24 to 34) on cars 39 spaced along and forming part of an endless conveyor 41 which extends around the spooler and moves in unison with the traveler 26. The bobbin 42 from each filled holder 28 on the conveyor is dropped into the first empty reserve pocket 29 that the car reaches and thus becomes the reserve bobbin 33 for such winding unit.

The need for refilling the holders with new bobbins is determined by a device 44 (FIGS. 1, 4, 35, 36 and 37) for sensing the movement past a predetermined point 45 of a succession of empty conveyor cars 39 corresponding to the number of bobbins in each transverse row on the trays 37, the signal thus derived being utilized to initiate a cycle of operation of a pick-up and elevating mechanism 40 (FIGS. 5 to 7 and 11 to 16) synchronized with the movement of the spooler conveyor 41 and including a vertically reciprocating fork 96 which slides the leading transverse row of bobbins upwardly from the tray along channels 90 to a ledge 102. A pusher 196 transfers these bobbins sidewise across the ledge into the pockets 46 of an endless feeder conveyor 47 (FIGS. 1, 3, 4, 7 and 18 to 24) which moves in synchronism with the spooler conveyor 41 and presents the successive bobbins 42 of the elevated group at a predetermined point 48 (FIGS. 1, 4, 18 and 20) as the respective empty cars 39 by which the signal was originated pass this same point. At this point, the bobbins are dropped one by one into the holders of the passing cars and are carried thereby on around the spooler frame, each bobbin being dropped into the first reserve pockets found to be empty.

Different groups of the winding units of the spooler may be assigned to the handling of different kinds of threads, the bobbins of which are deposited selectively in the proper reserve pockets of the winding units, the same intermediate conveyor 47 being utilized to transfer the different kinds of bobbin groups to the proper cars of the main conveyor 41.

INDEX

| | Column |
|---|---|
| The Invention in General | 4 |
| Synchronized Conveyors and Camshaft Drive | 5 |
| Bobbin Tray and Support Therefor | 6 |
| Bobbin Elevation | 7 |
| Feeder Conveyor and Bobbin Transfer | 10 |
| Spooler Conveyor Cars | 11 |
| Release of Bobbins From Cars to Reserve Pockets | 12 |
| Signaling Need for Reloading Cars | 15 |
| Handling Different Kinds of Bobbins | 17 |
| Overload Release | 19 |
| Simplified Synchronizing of Traveler and Spooler Conveyor Movements | 19 |
| Empty Tray Disposal | 20 |

In Barber-Colman multiple thread winders or so-called spoolers, a multiplicity of individual winding units are disposed side by side and arranged in two groups along opposite sides of frame around which an end finding and tying unit or so-called traveler moves continuously to service the idle winding unit that it passes and resume winding thereby.

In prior spoolers of this general type, an operator moves along the winding units after the traveler passes, deposits filled bobbins, hereinafter referred to as "bobbins," in the empty pockets of the winding units and hangs unwound lengths of the thread in clamps above the pockets. Picking up the threads of the bobbins in the reserve pockets and hanging the same in the clamps may be effected automatically by a mechanism carried by the traveler and operating in the manner disclosed in my application Ser. No. 463,575, filed June 14, 1965.

The primary object of this invention is to provide a new and improved mechanism for automatically handling bobbins as doffed from a standard spinning frame and loading the same one by one into the empty reserve pockets of a spooler thus eliminating the necessity of manually handling the bobbins.

Another object is to deposit filled bobbins in the empty reserve pockets of the spooler from holders on a patrolling conveyor which travels continuously around the winding units with the traveler and carries one or more groups of bobbins which are released successively and one by one as they pass the empty reserve pockets.

Still another object is to provide for release of bobbins to the reserve pocket with precise timing.

A further object is to load filled bobbins in groups into the patrolling conveyor and to control such reloading in response to the sensing of a predetermined succession of empty holders on the conveyor.

Another object is to effect the reloading of the patrolling conveyor through the medium of an intermediate conveyor whose operation is synchronized with the sensing of the succession of a predetermined number of empty holders on the patrolling conveyor.

A further object is to provide a novel mechanism for delivering filled bobbins in groups to the intermediate conveyor.

Another object is to assign bobbins of certain color, count, or other characteristic to certain winding units of the spooler and deposit in the empty pockets of such unit only reserve bobbins having such characteristics.

A further object is to deliver to the intermediate conveyor successive groups of bobbins which are carried by a common support advanced step by step to an unloading position.

The invention also resides in the novel mechanism for picking up successive groups of bobbins which are carried by a common support advanced step by step to an unloading position.

The invention also resides in the novel mechanism for picking up successive groups of filled bobbins and transferring the same to said intermediate conveyor, in the novel manner of timing the patrolling and intermediate conveyors and the bobbin-group pick-up mechanism.

A further object is to provide a carrier which is adapted to contain a plurality of groups of bobbins and of a novel construction to facilitate removal of said groups one by one.

Other objects and advantages of the invention will become apparent from the following detailed description taken in connection with the accompanying drawings, in which FIGURE 1 is a schematic plan view of a multiple winder incorporating the novel features of the present invention.

FIG. 2 is an end elevation of the frame of the main conveyor as viewed along the line 2—2 of FIG. 1.

Figure 5:
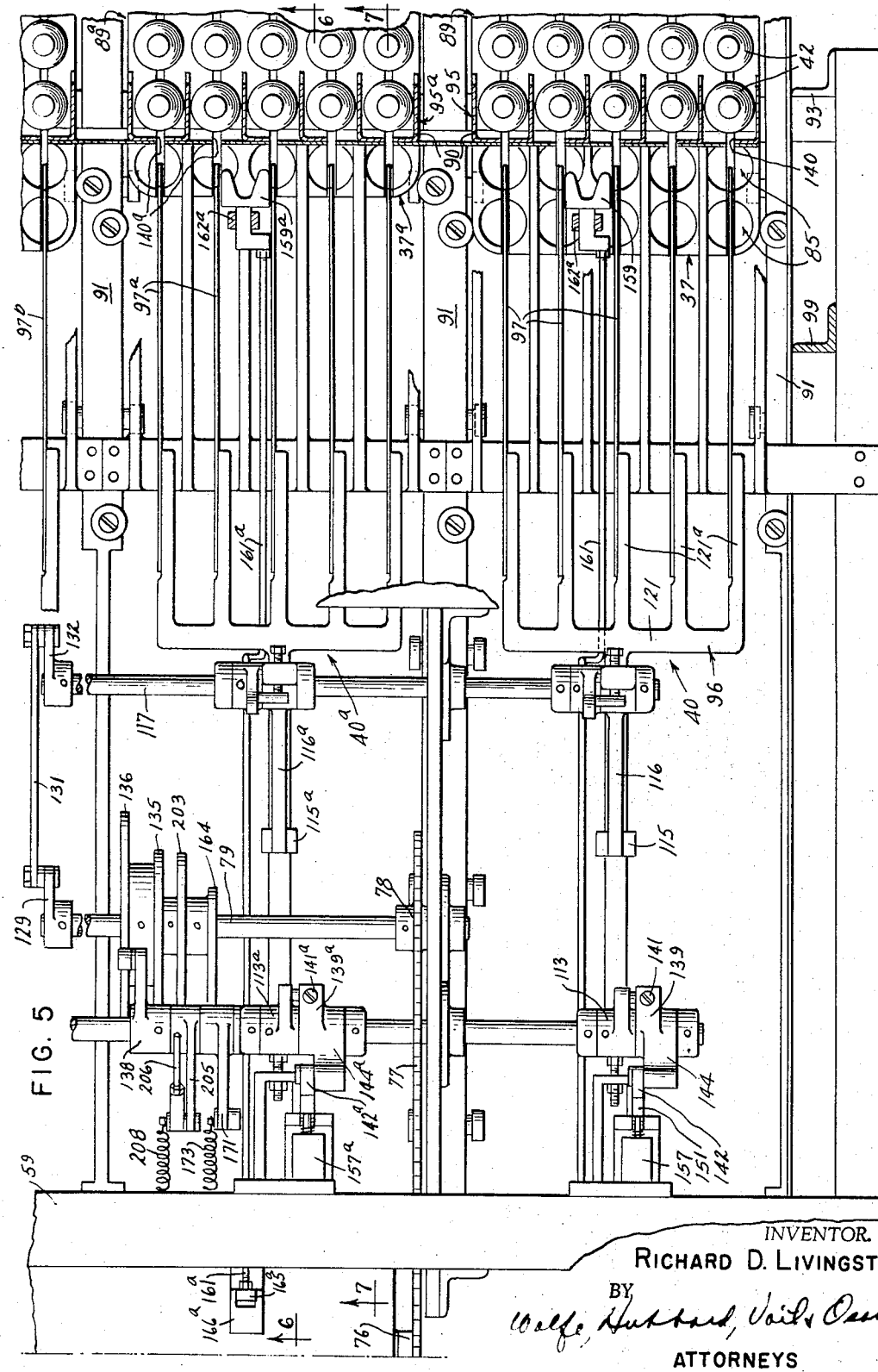
FIG. 5 is a fragmentary sectional view taken along the line 5—5 of FIG. 3.
Figure 6:
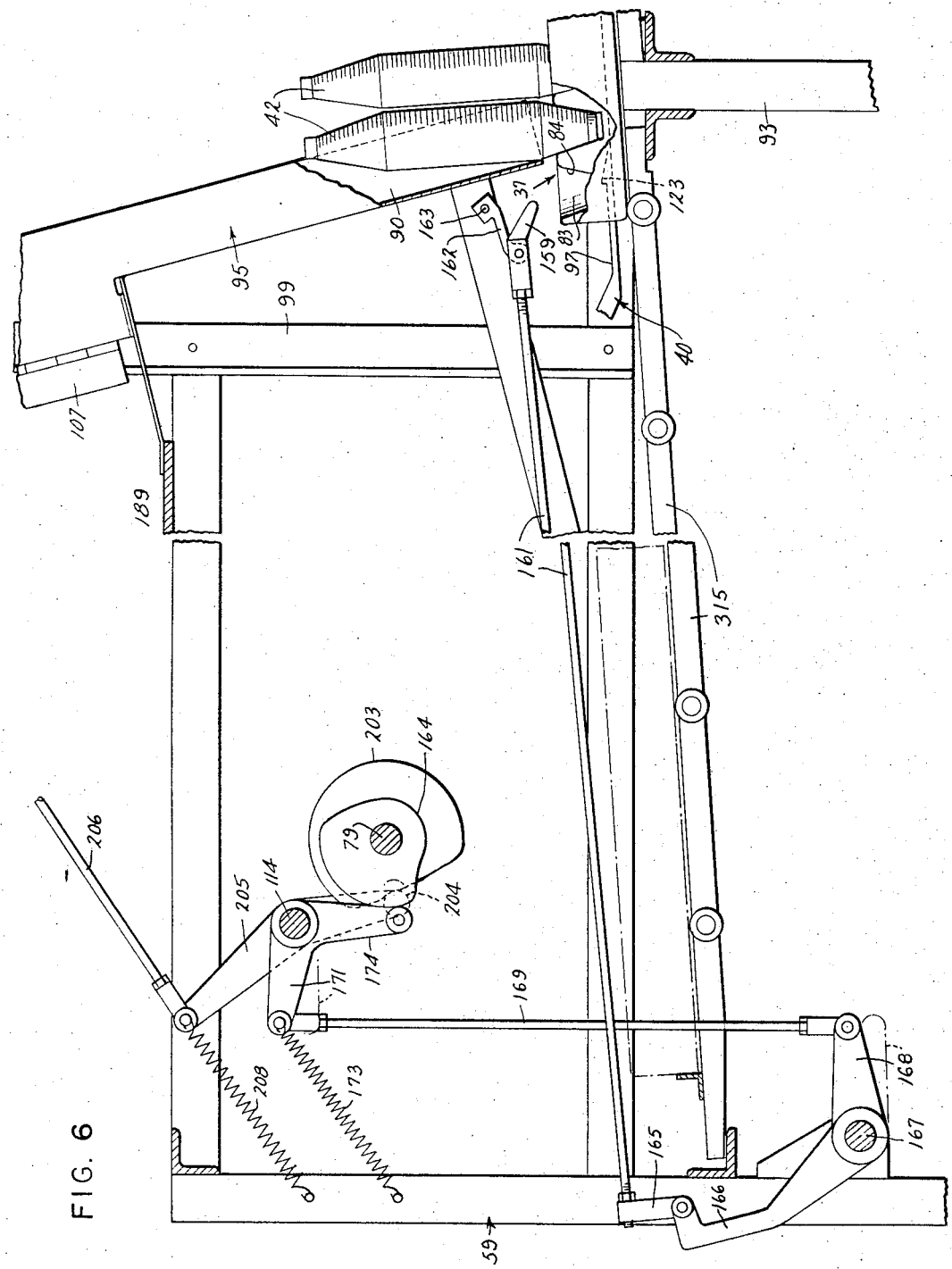
Figure 7:
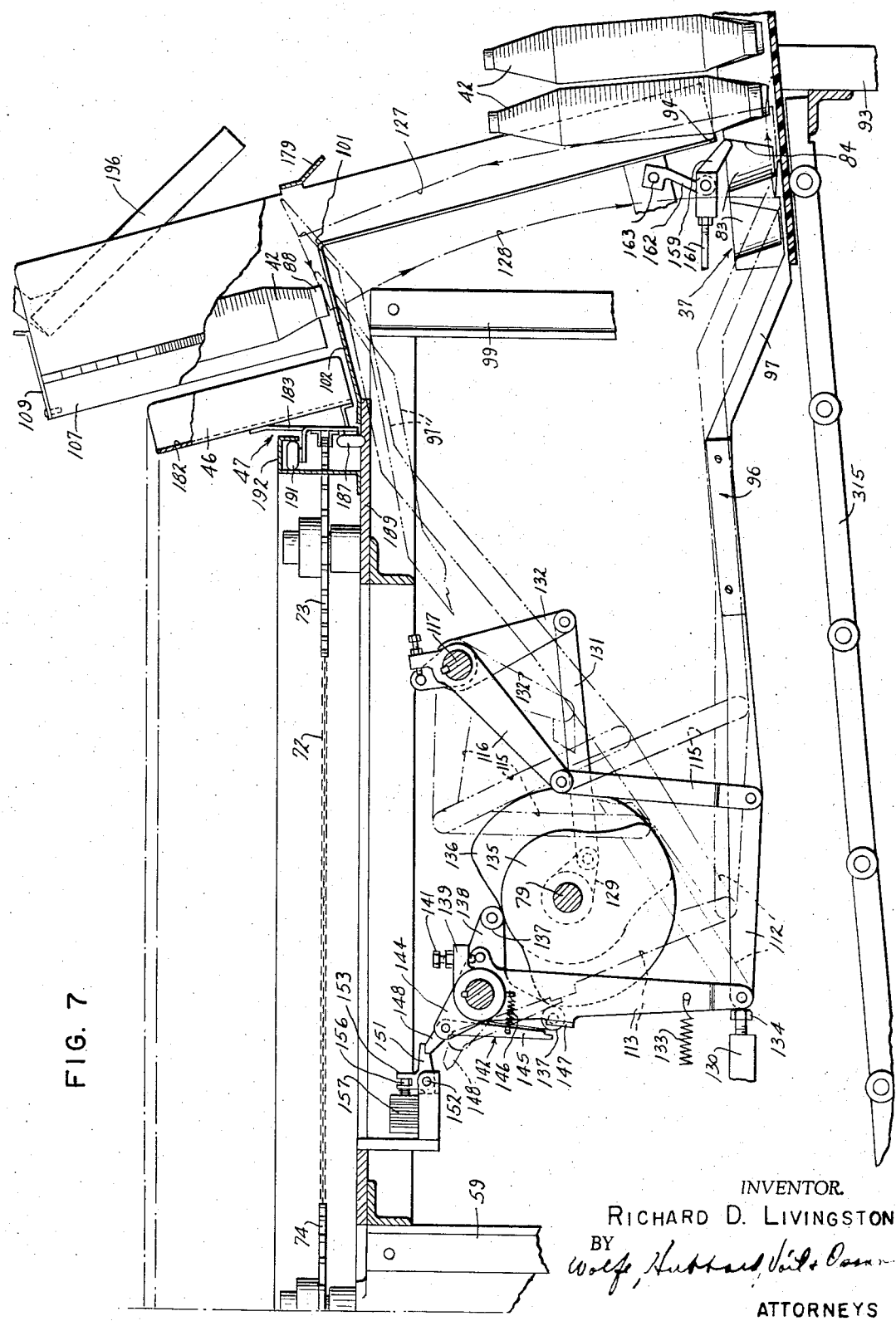

FIGS. 6 and 7 are fragmentary sectional view taken respectively along the lines 6—6 and 7—7 of FIG. 5.

FIG. 8 is a fragmentary perspective view of the tray for carrying bobbins.

FIGS. 9 and 10 are fragmentary sections taken respectively along the lines 9—9 and 10—10 of FIG. 8.

FIG. 11 is a fragmentary perspective view of the bobbin elevator and its actuator, the elevator being shown on a smaller scale.

FIG. 12 is a fragmentary perspective view of the bobbin elevating and transfer mechanism.

FIGS. 13 through 16 are portions of FIG. 7 showing successive positions of the bobbin during elevation.

Figure 3:
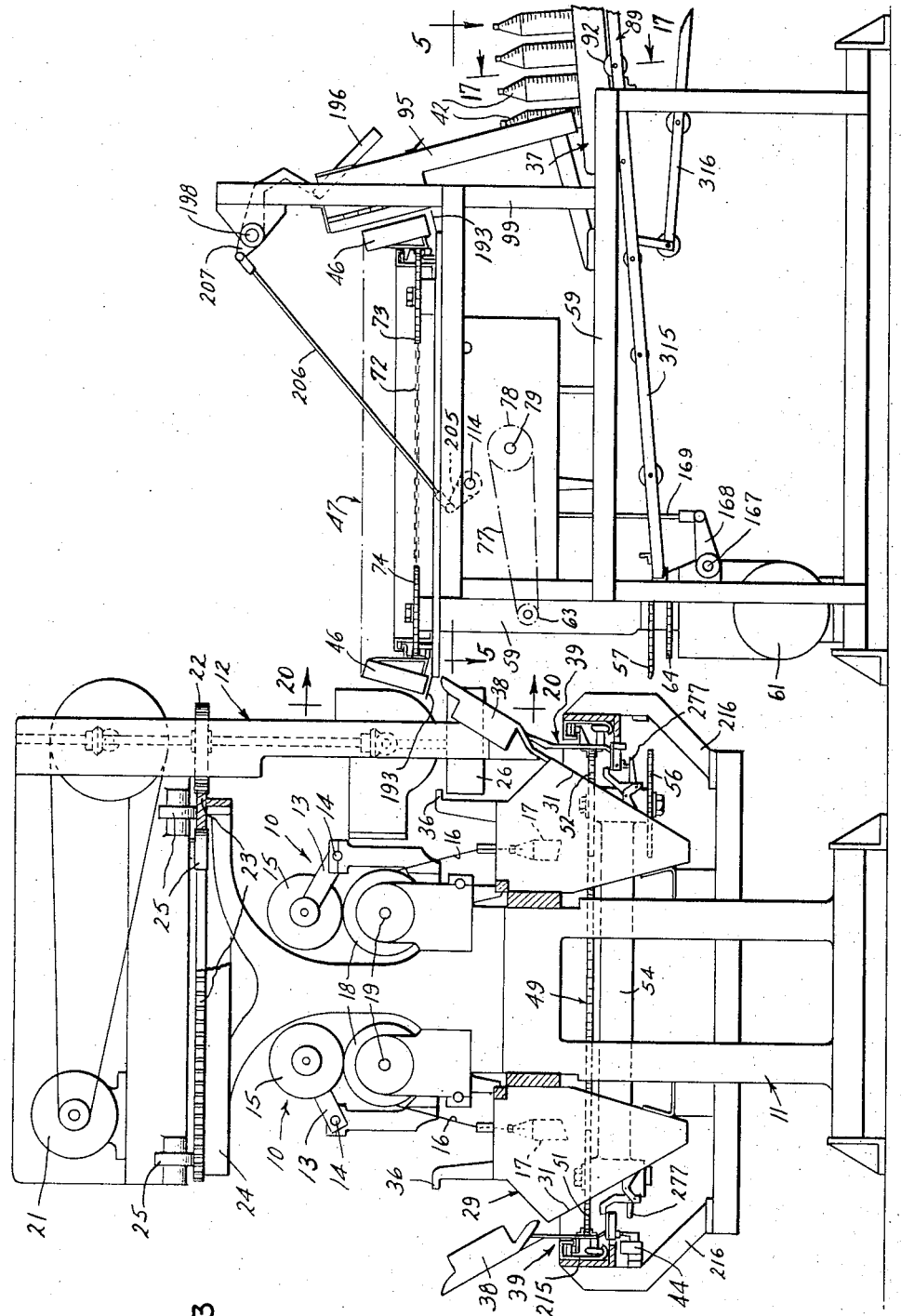
FIG. 3 is a fragmentary section taken along the line 3—3 of FIG. 1.
Figure 17:
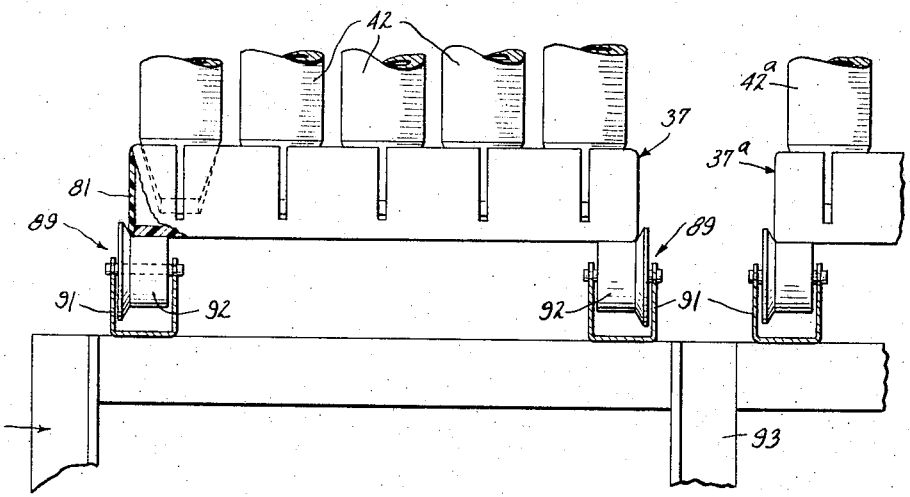

FIG. 17 is a fragmentary section taken along the line 17—17 of FIG. 3.

Figure 18:
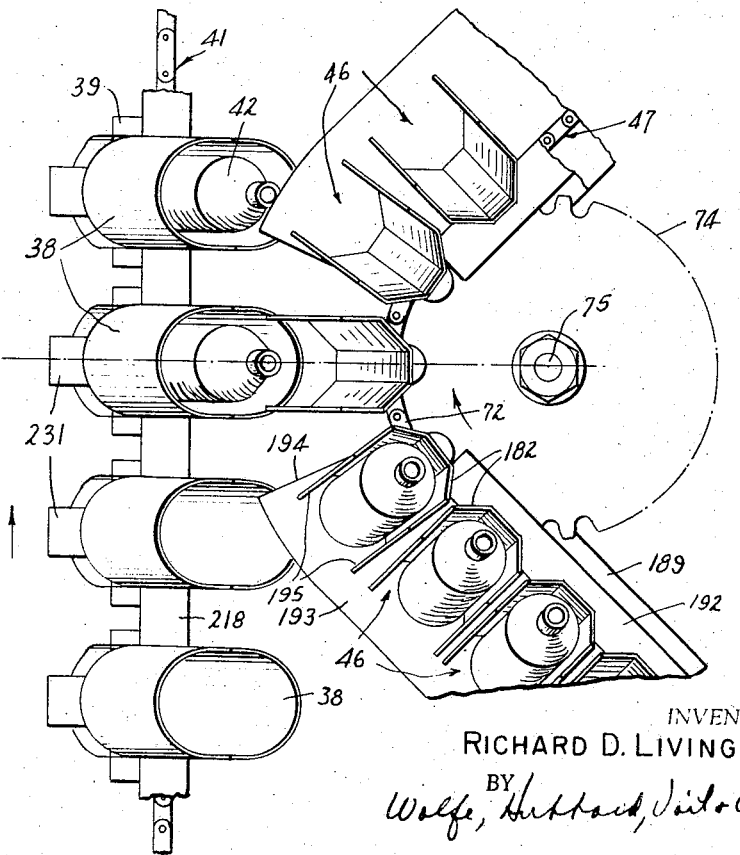

FIG. 18 is a fragmentary perspective view of part of the feeder conveyor and part of the main conveyor.

Figure 19:
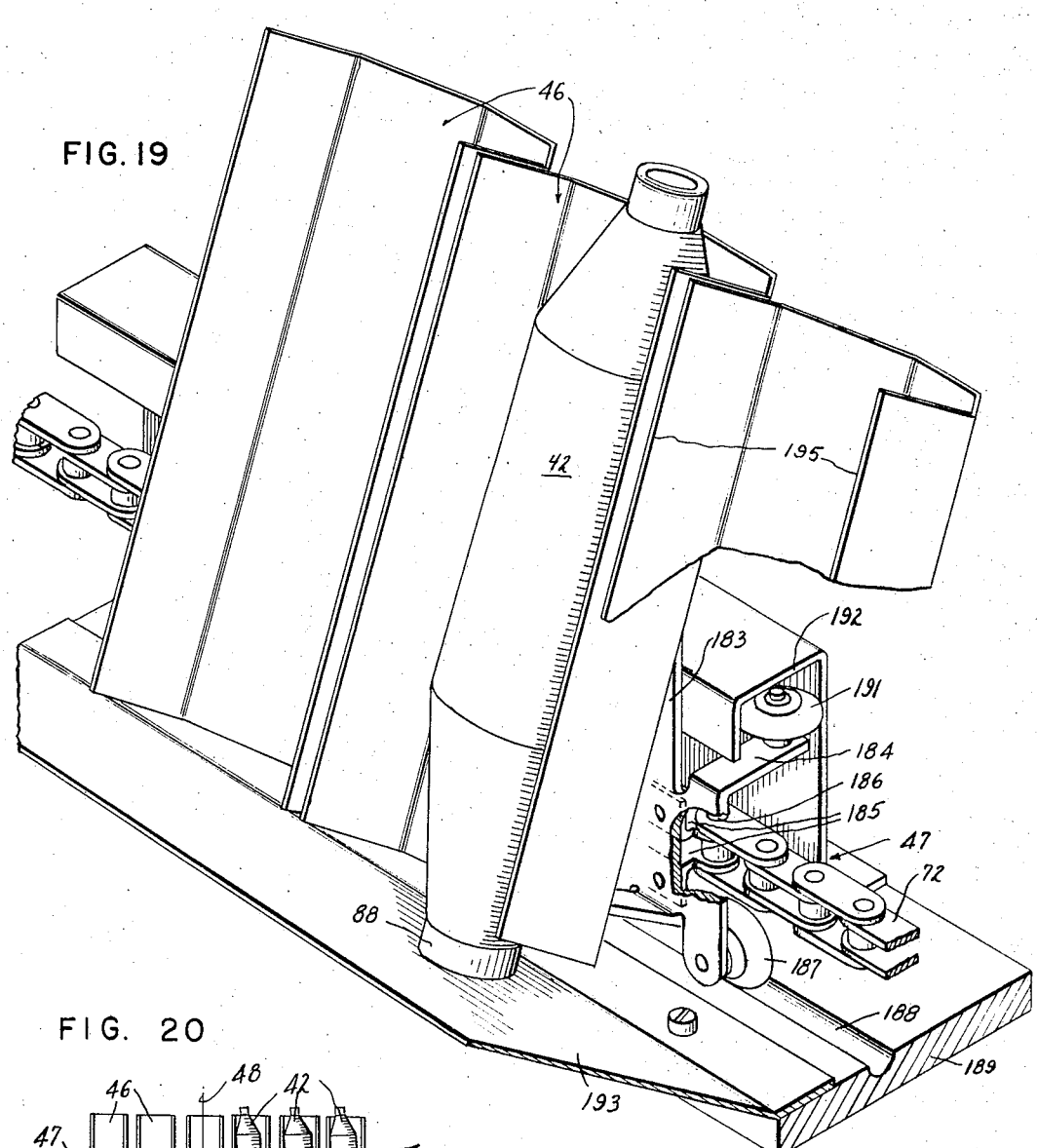

FIG. 19 is a fragmentary perspective view of the feeder conveyor.

Figure 20:
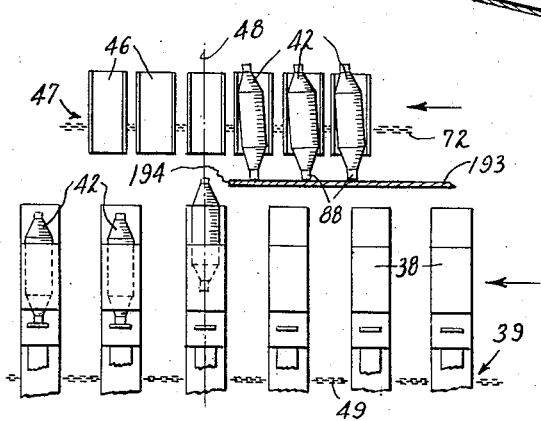

FIG. 20 is a schematic view taken along the line 20—20 of FIG. 3.

FIG. 21 is a fragmentary section taken along the line 21—21 of FIG. 22.

FIGS. 22 and 23 are fragmentary sections taken along the line 22—22 of FIG. 21.

Figure 24:
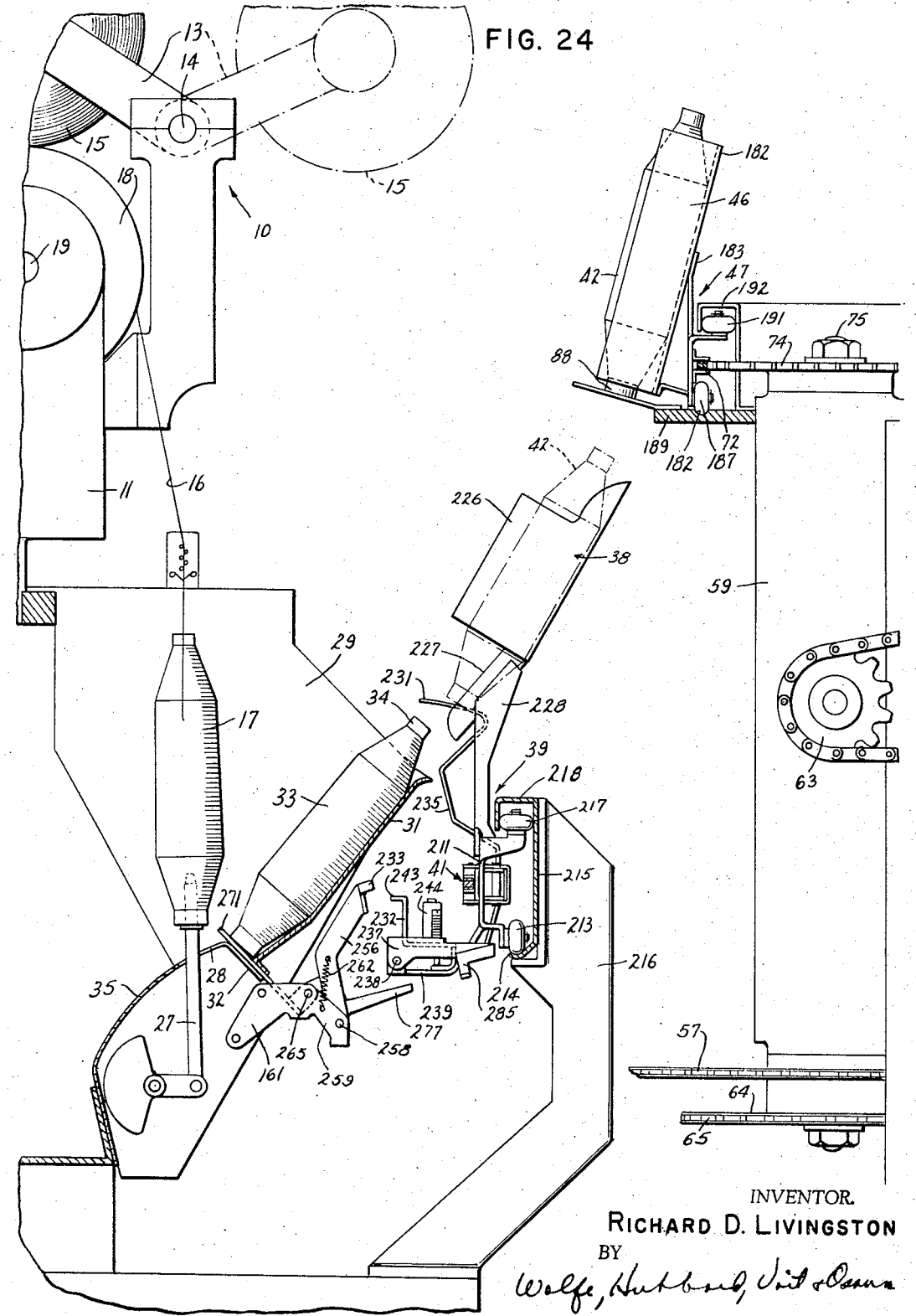

FIG. 24 is a fragmentary section taken approximately along the line 24—24 of FIG. 1.

FIG. 25 is a fragmentary section taken along the line 25—25 of FIG. 26.

FIG. 26 is a fragmentary section taken along the line 26—26 of FIG. 25.

FIGS. 27, 28 and 29 are fragmentary sections taken respectively along the lines 27—27, 28—28 and 29—29 of FIG. 25.

FIG. 30 is a part of FIG. 29 showing different positions of the parts.

FIG. 31 is a schematic view showing the arrangement of the blocking flags and trip lugs corresponding to the winding units having different kinds of bobbins.

FIG. 32 is a fragmentary perspective view of a conveyor car and bobbin release mechanism.

FIG. 33 is a fragmentary perspective view of the lower part of the conveyor car.

FIG. 34 is a fragmentary section taken along the line 34—34 of FIG. 26.

FIG. 34ᵃ is a fragmentary section taken along the line 34ᵃ—34ᵃ of FIG. 34.

FIG. 35 is a fragmentary perspective of one of the empty bobbin sensors.

FIG. 36 is a fragmentary section taken along the line 36—36 of FIG. 35.

FIG. 37 is a schematic plan view of the empty bobbin sensors.

FIG. 38 is a schematic perspective view of the conveyor and cam shaft drives.

FIG. 39 is a time chart.

FIG. 40 is a wiring diagram.

FIG. 41 is a wiring diagram of a simplified traveler-bobbin conveyor synchronizing circuit.

In the form shown in the drawings for purposes of illustration, the invention is incorporated in and as an addition to a Barber-Colman Type C spooler which comprises generally a multiplicity of winding units 10 (FIGS. 1, 3 and 24) arranged side by side and in two rows along opposite sides of frame 11 upstanding from a supporting floor within an endless path 9 around which a so-called traveler or tender 12 moves continuously and operates successively on idle ones of the units to service such units and resume winding thereby. Each winding unit includes an elongated arm 13 fulcrumed at 14 on the frame and carrying a laterally projecting spindle rotatably supporting the core of a cheese or cone 15 onto which the thread 16 of a supply bobbin 17 is wound to form a package of the desired size. Such winding occurs while the supply thread remains unbroken as shown in FIGS. 3 and 24 with the cheese resting on the top of and driven continuously by a rotating traversing drum 18 carried by a shaft 19 disposed within and paralleling one side of the traveler path. In the winding position, the arm 13 projects generally horizontally and inwardly from the pivot 14 as shown in full in FIG. 3.

The traveler is moved continuously around the endless path 9 and the frame 11 successively past the winding units 10 which are arranged in two parallel lines which terminate short of the curved ends of the traveler path 9. Power is supplied by a motor 21 (FIG. 3) which through suitable gearing and belts drives a gear 22 meshing with the teeth on an overhead rack bar 23 fixed to the top 24 of the frame 11. Rollers 25 support and guide the traveler frame an upright portion of which hangs downwardly in front of the winding units and carries the knotter and other operating parts of a tying unit 26 by which the idle winding units are serviced.

The supply bobbins 17 for the winding units 10 are supported on skewers 27 (FIG. 24) upstanding through slots 28 in the bottoms of upwardly opening pockets 29 mounted on and uniformly spaced along the frame 11 below the winding drums 18 and also below the path traversed by the tying unit 26. The front wall 31 of each pocket is inclined upwardly and outwardly and coacts with a downwardly sloping bottom wall 32 (FIG. 24) to support a reserve bobbin 33 with the upper end of the core 34 thereof disposed somewhat below the path of the tying unit. When the running thread 16 breaks, the skewer 27 is retracted downwardly to allow the bobbin to slide down a plate 35 and be carried away. The reserve bobbin is then transferred to the winding position. This is effected in some spoolers by moving the pocket with the bobbin therein. In the present instance, the transfer is accomplished by swinging the skewer through the slot 28 into alinement with the reserve bobbin 33, raising it into the core of the latter, and fiinally swinging the skewer reversely to place the new bobbin in the winding position.

In service operation of spoolers of the above character, new reserve bobbins 33 are manually dropped endwise by the operator into the pockets 29 that have become empty. The operator finds the end of the thread, pulls the same upwardly and lays it in a clamp 36 (FIG. 3) of the associated winding unit. The reserve thread thus hung up is positioned for engagement at the proper time with the tying unit 26 on the advancing traveler. When the thread being wound breaks or becomes exhausted, a pull wire (not shown) is actuated to swing the cheese arm 13 upwardly from the winding position and overcenter past a vertical position from which the arm gravitates to the idle position shown in phantom in FIG. 24, the arm then projecting forwardly and generally horizontally from its pivot.

In passing each idle winding unit, the tying unit 26 operates to pick up the end portion of the broken thread, bring it adjacent the thread hung up in the clamp 36 and tie the two threads together. The cheese arm is then cammed upwardly and lowered onto the driving drum 18 to resume the winding. The structure for performing these functions and its automatic operation are fully disclosed in Patent Nos. 1,267,977 and 1,686,102 to which reference may be had for further details.

*The invention in general*

Generally stated, the present invention adds to the spooler above described mechanism which operates entirely automatically to pick up rows or groups of filled bobbins 42 supported in a carrier or tray 37 (FIGS. 1, 3, 8 to 11), transfer successive groups as needed into successive empty holders 38 (FIGS. 18, 24 to 34) on cars 39 spaced along and forming part of an endless conveyor 41 which extends around the spooler, is spaced outwardly from the endless path 9 and moves in unison with the traveler 26. The bobbin 42 from each filled holder 38 on the conveyor is dropped into the first empty reserve pocket 29 that the car reaches and thus becomes the reserve bobbin 33.

The need for refilling the holders with new bobbins is determined by a device 44 (FIGS. 1, 4, 35, 36 and 37) for sensing the movement past a predetermined point 45 of a succession of empty cars 39 corresponding to the number of bobbins in each transverse row on the trays 37, the signal thus derived being utilized to initiate a cycle of operation of a pick-up and elevating mechanism 40 (FIGS. 5 to 7 and 11 to 16) synchronized with the movement of the spooler conveyor 41 and operating to elevate the leading row of bobbins from the tray and transfer the same into the pockets 46 of an endless feeder conveyor 47 (FIGS. 1, 3, 4, 7 and 18 to 24). The latter moves in synchronism with the spooler conveyor 41 and presents the successive bobbins 42 of the elevated group at a predetermined point 48 (FIGS. 1, 4, 18 and 20) as the respective empty cars 39 by which the signal was originated pass this same point. At this point, the bobbins are dropped one by one into the holders of the passing cars and are carried thereby on around the spooler frame, each bobbin being dropped into the first reserve pockets found to be empty.

In certain spoolers of the above character, different groups of the winding units, for example those disposed on opposite sides of the spooler frame 11, are assigned to the handling of different kinds of threads, that is, different counts, color or other character, the bobbins of which are deposited selectively in the proper reserve pockets of the winding units 10 assigned to the handling of the respective kinds of bobbins. The present invention performs these functions entirely automatically by the addition of other empty cars sensors 44ª (FIGS. 1 and 4) controlling the selective activation of one or more additional pick-up mechanisms 40ª (FIG. 5) to which bobbins of the different colors or counts are delivered from trays 37ª, the same intermediate conveyor 47 being utilized to transfer the different kinds of bobbin groups to the proper cars of the main conveyor 41.

Synchronized conveyors and camshaft drive

The spooler conveyor 41 (FIGS. 25, 26, 33 to 35, 38) includes an endless generally rectangular loop somewhat larger than the path 9 traversed by the traveler 12 and comprises the cars 39 secured to an ordinary link chain 49 extending around and meshing with three idle sprockets 51 (FIGS. 1, 2, 3) and a drive sprocket 52 which are disposed in a horizontal plane and define corners of the loop. The sprockets 51 are loose on upright studs 53 on the outer ends of cross-bars 54 (FIG. 2) secured to opposite ends of the spooler frame 11. The drive sprocket is fixed on the upper end of a shaft 55 journaled in one of the cross-bars. Between the sprockets and along the winding units 10 the chain is supported and guided in a manner to be described later.

Fast on the lower end of the shaft 55 is a sprocket 56 meshing with an endless link chain 57 (FIGS. 3 and 38) which meshes with a gear on an upright countershaft 58 journaled on a box-like open frame 59 adjacent one side of the spooler and supporting a drive motor 61 and appropriate speed reduction gearing within a box 62 (FIG. 38). The output shaft 63 is coupled to the countershaft 58 through sprockets 64 and a chain 65. Through a suitable means such as control unit 66 (FIG. 40) the operation of the motor 61 is regulated so that the traveler 12 and the conveyor chain 46 move together and never interfere with each other as by moving at precisely equal speeds. Thus, the conveyor and traveler motors may both be energized by closure of switches 67 upon energization of a relay 68 which, after energization through a starting switch 69, is maintained through a holding circuit including a switch 71 of the relay and a normally closed switch 312 of a relay 311.

Figure 4:
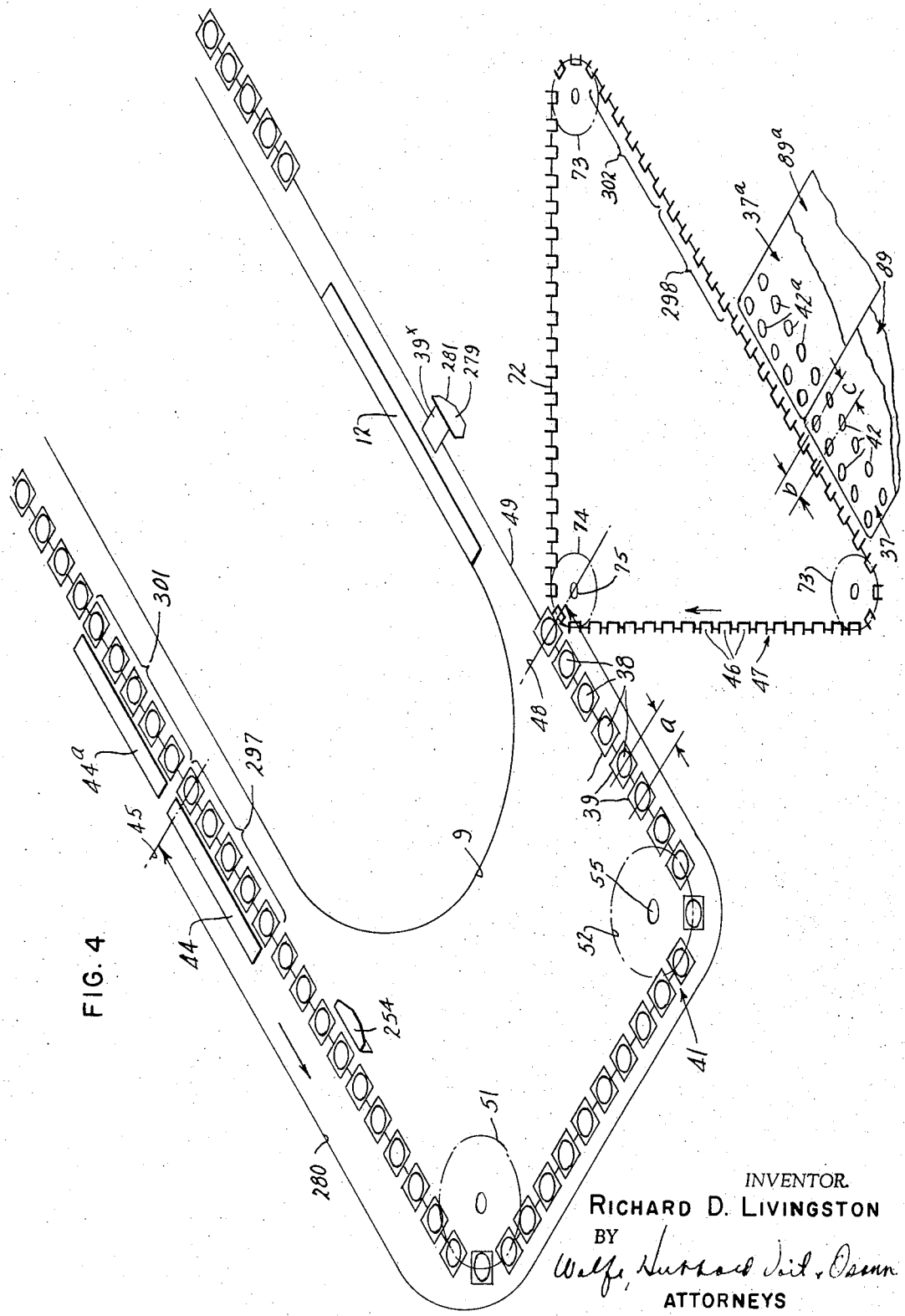
FIG. 4 is a schematic perspective view of elements of the spooler and feeder conveyors.

The endless feeder conveyor 47 (See FIGS. 3, 4, 7, 12, 21, 38) for transferring groups of bobbins one by one to the spooler conveyor is similarly composed of ordinary link chain 72 but is held in the form of a horizontal endless loop by meshing with idler sprockets 73 and a drive sprocket 74 supported by the frame 59. The vertical shaft 75 (FIG. 38) of the drive sprocket is coupled through two sets 75ª of bevel gears and an intermediate horizontal shaft 75ᵇ to the countershaft 58. While the conveyor loop may be of various shapes, it is triangular in the present instance. As shown in FIGS. 1, 4 and 38, the apex of the triangle defined by the drive sprocket is disposed close to a straight run of the spooler conveyor 41 so as to define the point 48 at which the bobbins are dropped from the feeder chain into the holders 38 on the passing cars 39.

A sprocket 76 (FIGS. 24 and 38) fast on the extended end of the shaft 75ª is coupled through an endless chain 77 and a sprocket 78 to a horizontal shaft 79 which is journaled on and extends transversely of the frame 59. This shaft carries the various cams later to be described for actuating the mechanisms for picking groups of bobbins out of the leading tray 37 and elevating and transferring the same to the pockets 46 of the feeder conveyor 47 in precise timing relative to the advance of the spooler conveyor.

The spacing of the cars 39 along the chain 49 is substantially equal to the spacing of the reserve pockets 29 of the spooler, the pitch a (FIG. 4) being about five inches in the present instance. The spacing of the pockets 46 along the chain of the feeder conveyor is somewhat less, the pitch b being about three inches which corresponds approximately to or is somewhat larger than preferred center spacing c of the bobbins in transverse rows of the tray 37. By properly sizing the drive sprockets and gearing, the linear speeds of the conveyors 41 and 47 are equalized so that each pocket 46 passing the dropping point 48 will be alined vertically and properly centered relative to one of the holders 38 on the spooler conveyor.

With the conveyors 41 and 47 and the camshaft 79 positively coupled together through the medium of link chains 49, 57, 72 and 77, they will move precisely in unison so that a particular succession of empty cars 39 on the spooler conveyor will, by initiating operation of the pick-up mechanism 40 at the proper time, each the loading point 48 and be filled from the feeder conveyor 47 with the bobbins of the leading row picked out of the tray 37 in the camshaft cycle initiated by a signal from the empty car sensor 44.

Bobbin tray and support therefor

Each bobbin tray supports a substantial number of bobbins in a plurality of uniformly spaced rows each comprising the same number, five in the present instance, disposed in upright substantially parallel relation. In the present instance (see FIGS. 8, 9 and 10) the tray is specially constructed to facilitate loading by an automatic spinning frame doffer. While the tray may take various forms, it is shown as comprising a generally rectangular frame having a peripheral wall or skirt 81 depending from the edges of a top plate 82 having upwardly opening recesses 83 defined by the downwardly converging internal walls 84 of conical cups 85 depending from the underside of the plate. The flaring of the cup wall corresponds to the taper of the lower end portion of the bobbins including the thread mass 86 thereon so that this portion is quite closely confined as shown in FIG. 9, the bobbins thus being held in substantially vertical positions and projecting above the plate 82. The conical shape of the cups facilitates automatic loading of the tray by guiding the bobbins into upright centered positions as they are dropped endwise into the cups.

To enable the successive rows of bobbins to be raised out of the tray by a pick-up fork about to be described, the cups 84 and the leading and trailing sides of the tray skirt 81 are formed with parallel slots 87 opening upwardly and disposed in the vertical plane including the axes of the corresponding cups of all of the transverse rows in the tray. The bottom of each slot is disposed somewhat below the bottoms of the cups 85 and the lower ends 88 of the cores of the bobbins supported therein. The construction as above described may, if desired, be a single-piece molding of plastic, paper composition, or the like.

Trays containing the bobbins to be loaded into the spooler pockets are disposed substantially horizontally and supported end to end in a suitable conveyor for step by step advance to present the leading transverse row of bobbins to a pick-up or unloading position (FIG. 6) toward which the trays are preferably biased continuously. Herein the conveyor takes form of a chute 89 which is inclined downwardly at an angle sufficient to induce downward gravitation to present rows of bobbins of the leading tray successively into the pick-up position. The chute comprises rails 91 (FIGS. 5 and 17) laterally spaced according to the width of the trays 37 and flanged rollers 92 engaging the lower edges of the skirt along opposite sides of the trays so as to support the tray and center the same in the chute as it rolls downwardly. The chute is supported from the floor and at the proper angle by a suitable frame including legs 93 (FIG. 3) at the outer end of the frame 59.

*Bobbin elevation*

The trays are advanced step by step along the chute to present the leading transverse row of bobbins to a pick-up or unloading position which is determined by a suitable stop which, after removal of the leading row of bobbins, allows the tray to advance one step under the continuously applied biasing force. In the present instance, the stop acts on the tray through the medium of the yarn masses of the bobbins and is stationary, being formed by the lower ends 96 of upright guide channels 95 into which the bobbins of the leading transverse row are advanced preparatory to being unloaded from the tray. From this pick-up position (FIG. 6) of the tray, the bobbins are raised out of the tray recesses and along the channels 95 by upward swinging of a fork 96 of the bobbin pick-up and elevating mechanism 40 above referred to. Fingers 97 on the latter are projectable into and along the tray slots beneath the lower ends of the bobbins as shown in FIGS. 6, 7, 10 and 13. The cups 85 hold the bobbins with sufficient firmness to avoid substantial tipping when they come against the stops 94, the points of engagement being close to the top 82 of the tray plate.

As shown in FIGS. 3, 6, 12, 21 and 22, the channels 95 along which the picked-up bobbins are slid upwardly are made of sheet metal and of squared U-shaped cross-section somewhat wider than the maximum diameter of the thread mass of the bobbins. The side walls 90 of the channels are angle bars having flanges welded to a plate 98 inclined upwardly and forwardly at an angle such as to induce forward tilting of the bobbins and retention in the channels as they are being raised. The plate is secured to an upstanding post 99 (FIG. 3) at the end of the frame structure 59 above described.

The bottoms of the channels terminate at the outer edge 101 (FIGS. 7 and 12) of a ledge 102 which slopes forwardly and downwardly to receive the lower ends of the bobbins after elevation thereof just above the level of the edge. The ledge is an extension of the channel backing plate 98 and, at its inner edge, is secured at 103 to the top of the frame 59. Above the ledge, the side walls of the channels 95 are widened as indicated at 104, extend across the ledge, and cooperate with gates 105 to form outwardly opening channels or pockets 106 (FIGS. 7, 12 and 22) for receiving, temporarily holding, and positioning the bobbins raised onto the ledge. Each gate comprises two rectangular plates 107 hinged along one edge on upright pins 108 spanning and secured to the ledge 102 and a top plate 109 (FIG. 7) and tilted forwardly at a small angle to correspondingly incline the pockets 106. From their hinges, the plates converge forwardly with their free edges meeting at stop pins 109a on the top plate. Torsion springs 111 around the hinge pins urge the plates toward and normally hold the same against the stops as shown in FIG. 22 while allowing the gate to open as shown in FIG. 23 as a bobbin standing on end on the ledge and in the pocket 106 is forced broadwise toward and through the gate.

The channels 95 along which the bobbins are elevated out of the tray are spaced according to the spacing of the bobbins in the tray while the lateral spacing of the gates 105 corresponds to that of the pockets 46 on the feeder conveyor. The small difference in the bobbin and feeder pocket pitches $b$ and $c$ (FIG. 4) is achieved by inclining the side walls 104 of the five transfer pockets 106 relative to each other as shown in FIG. 22.

The fork 96 for picking up and elevating the leading row of bobbins is fixed to and projects from the end of an elongated horizontal bar 112 (FIGS. 7 and 11) suspended at its opposite end from an arm 113 fixed to and depending from a rockshaft 114 and about midway between its ends from an upright link 115 pivotally suspended from the end of an arm 116 fast on a rockshaft 117. The two shafts are journaled at opposite ends in the sides of the frame 59. The fingers 97 of the fork are secured to the sides of rigid projections 121a formed with a cross-member 121 at the closed end of the fork and laterally spaced to correspond to the spacing of the slots 87 in the tray 37. In all of its positions, the cross-member and the projections are disposed above the top of the tray.

Beyond the projections 121a, the fingers are inclined downwardly to end portions 119 which project into and extend along the bottom of the tray slots 87. Lugs 123 extending along and upstanding from the ends of the fingers are adapted to enter the lower ends 88 of the bobbin cores as shown in FIG. 14 and are formed with upright abutments 124 which engage the inner wall of the bobbin cores and prevent shifting thereof along the fingers while the bobbins are being elevated by the fork as shown in FIGS. 13 to 16. The fingers are thinner than the slots in the trays and, because the inclined portions are deeper than the thickness of the trays 37, the latter may be indexed downwardly and past the fork fingers to allow all of the transverse rows of bobbins to be persented in the pick-up position against the stops 94, the fingers 97 of the fork always remaining above the top of the trays.

The pick-up fork is raised and lowered continuously as indicated at 125 and 126 on the time chart (FIG. 39) between the positions shown in full and in phantom in FIG. 7 and in full in FIGS. 13 and 16, the fingers 97 moving in slots 140 in the bottoms of the channels 95 and in the ledge 102. The abutments 124 on the fingers 97 move upwardly along a path 127 and downwardly along a path 128. The up and down movements are effected by a crank 129 fixed to the camshaft 79 above described so as to be rotated in unison with the motion of the spooler conveyor 41. The crank is coupled through a link 131 with the free end of an arm 132 fast on the rockshaft carrying the arm 116 for raising and lowering the link 115 and the bar 112. In the retracted position shown in full (FIG. 7), the lugs 123 on the fingers 97 are spaced from the bobbins in the pick-up position so that the raising and lowering of the fork in the slots of the tray are idle motions.

The fork is urged horizontally by a spring 133 toward the retracted and inactive position which is determined by an adjustable stop in the form of a screw 134 threaded into a part 130 (FIG. 11) of the frame 59. Advance of the fork to active pick-up position is effected positively by horizontal swinging of the arm 113 by the action of cams 135 and 136 (FIGS. 7 and 11) fast on the shaft 79 and acting on follower rollers 137 on the arms of a bell-crank 138 which is fast on the rockshaft 114 carrying an arm 139 through which the angular relation of the shaft and the fork actuating arm 113 is adjusted by a screw 141. The shaft is adapted to be coupled to the fork actuating arm through a detent in the form of a bell-crank 142 fulcrumed at 143 on the free end of an arm 144 fixed to the shaft 114. A depending arm 145 of the bell-crank is urged by a spring 146 toward a position (FIG. 11) for engagement with an abutment 147 when the end of a horizontally projecting arm 148 of the bell-crank is released from an abutment 149 on a latch 151. The latter comprises a bell-crank lever pivoted at 152 on the frame 59 with its upstanding arm 153 urged by a spring 155 clockwise and toward engaged position (FIG. 7). In this position, the detent arm 145 is held out of alinement with the abutment 147 so as to pass the latter as the pivot 143 and the detent 149 move downwardly during the continuous oscillation of the pivot between the positions shown in full and in phantom in FIG. 7, the detent remaining engaged with the latch abutment.

The armature 156 of a solenoid 157 is connected to the arm 153 of the latch 151 which, when the solenoid is energized, is rocked counterclockwise to raise the abutment 149 and release the detent 145 for engagement with the abutment 147. The detent is thus coupled to the arm 113 (FIG. 11) which, during the next downstroke of the detent is rocked counterclockwise moving the arm 113 away from the stop 134 and advancing the fork from the retracted position shown in full in FIG. 7 to that shown in phantom. This occurs at 158 (FIG. 39) during the ensuing revolution of the camshaft, the fork having been swung downwardly as indicated at 126 by its actuating crank 129.

It will be apparent from the foregoing that the fork is raised and lowered as indicated at 125 and 126 (FIG. 39) continuously while it remains retracted by virtue of the deenergized condition of the solenoid 157. But after energization of the solenoid in response to a call for bobbins to fill five successive holders 38 on the conveyor 41, the fork is advanced and retracted horizontally as indicated at 158 and 177, 178, 181 (FIG. 39) and in the ensuing cycle of the camshaft moves along the vertical orbital path 127 (FIG. 7) to advance the fork fingers beneath the leading bobbins, elevate the latter along the channels 95, draw the bobbins across the ledge 102, and lower idly at 128 (FIG. 39) leaving the transferred bobbins standing on end on the ledge 102.

During the advance of the fork, the trays 37 are pushed backwardly up the chute so as to separate the bobbins from the stops 94 and avoid any possibility of interference with the elevation of the bobbins by the fork. This is accomplished by a forked finger 159 (FIGS. 5, 6, 7 and 13) inclined downwardly from the end of a generally horizontal rod 161 pivotally suspended by an arm 162 swingable about a pivot 163 by a cam 164 on the shaft 79 between the retracted and advanced positions shown in FIGS. 6, 7 and 13 respectively. The opposite end of the rod carries a rigid arm 165 pivotally connected to the free end of an arm 166 fixed to a rockshaft 167. An arm 168 on the latter is joined by a link 169 to one arm of a bell-crank 171 fulcrumed on a shaft 114 on the frame 59 and rocked back and forth against a biasing spring 173 by the cam 164 acting on a follower roller 174 on the other bell-crank arm.

In the retracted position indicated at 175 (FIG. 39), the pusher 159 is disposed as shown in FIG. 6 above the top of the leading tray 37. As the rod is advanced by the cam 164 as indicated at 176, the end of the pusher is lowered below the top of the tray for engagement with the leading end of the tray skirt 84 or with the trailing sides of two of the first empty cups 85 (See FIG. 13) ahead of the bobbins in the pick-up position. In the final part of the advance, the trays are pushed backwardly along the chute 89 and the thread masses 86 are separated from the stops 94. The bobbins are thus released for free elevation in the ensuing raising of the fork 96.

When the tray and the leading row of bobbins have been pushed away from the stops 94 and the lugs 123 have moved into the holes in the lower ends of the bobbin cores as shown in FIG. 13, upward movement of the fork is started by the crank 129. In the initial raising out of the cups of the tray, the bobbins, then supported by the fork 96 with the lower ends positioned by the lugs 123, tip forwardly into the channels 95 and thus become positioned and urged against the channel bottoms as shown in FIG. 14 as they are slid upwardly while the lower ends of the cores are held in parallel relation and against reverse sliding off from the fork fingers. The cams 135, 136 are shaped to draw the fork a short distance backwardly as indicated at 177 (FIG. 39) and then push it forwardly at 178 so that the path 127 (FIG. 7) traversed by the lugs 123 is substantially straight and parallels the bottoms of the channels 95. In the upward movement, the bobbins pass a bar 179 spaced outwardly from the ledge 102 and thus are held against possible outward tipping.

When the major length of the bobbins has passed above the edge 101 of the ledge, the bobbins tip forwardly toward the gates and into the channel-like pockets 106 as shown in FIG. 15. Finally, when the lower ends become disposed above the ledge, retraction of the fork as indicated at 181 (FIG. 39) is initiated and the abutments 124 on the fork lugs 123 assist in sliding the lower ends of the bobbin cores across the ledge. The full length of the thread mass then comes against the then closed gates 105 or bottoms of the pockets 106 as shown in FIG. 16 as the fork lugs 123 are moved below the lower ends of the bobbin cores and start downwardly at 126 (FIG. 39) along the return path 128.

It will be apparent from the foregoing that each energization of the solenoid 157 not only renders the fork 96 active to elevate the leading row of bobbins out of the tray and along the channels 95 but also controls the step by step advance of the tray under the biasing force continuously acting thereon, the transverse rows of bobbins being brought successively to the unloading position (FIG. 6). Also to be observed is the slight forward inclination of the transverse row of bobbins as seated in the cups 84 whose axes are tipped forwardly due in this instance to the downward inclination of the tray supporting chute. Such forward tipping of the bobbins insures proper seating of the bobbins of each row in the channels 95 when reaching the unloading position (FIG. 6).

*Feeder conveyor and bobbin transfer*

As soon as the group of bobbins has been elevated onto the ledge and moved against and positioned by the gates 105, they are pushed sidewise through the gates and into outwardly opening pockets 46 (FIGS. 1, 3, 19 and 21) disposed side by side around the full length of the continuously moving feeder conveyor 47. Each pocket comprises a sheet metal channel 182 somewhat wider than the diameter of the thread mass on the bobbin and having a flat bottom welded to the ends of arms 183 projecting upwardly and outwardly from individual cars 184 of right angular cross-section. Spaced horizontal lugs 185 (FIG. 19) on each car straddle the chain 72 above described and receive and are clamped to a shouldered pivot pin 186 on the chain. Rollers 187 journaled on the car ride in an endless groove 188 on a plate 189 and support the car in its travel around the triangular path above described. The plate is fixed to the top of the frame 59. To guide the car laterally horizontal rollers 191 journaled thereon ride in a track 192 of channel cross-section secured to the plate 189.

To utilize gravity in locating the bobbins in definite upright positions, the same as in the channels 95 and the gated pockets 106, the conveyor pockets 46 are inclined upwardly and inwardly and disposed substantially normal to the ledge 102, an extension 193 (FIGS. 19, 22) of which closes the lower ends of those pockets which at any time are disposed opposite the gates 105. The extension is continued around the remainder of the conveyor to the dropping point 48 (see FIGS. 1, 4, 18 and 20) thus forming a track along which the bobbins are slid sidewise while standing on end. The dropping point is defined by the end 194 of the track 193. To center the bobbins laterally in the pockets as shown in FIGS. 18, 19 and 22, the sides 195 of the channel converge toward the flat center portion or bottom. The pockets are a little wider than the filled bobbins so as to receive the latter properly during the rapid transfer through the gates 105. To space the latter to correspond to the pockets, the side walls 104 of the channels 106 are inclined as shown in FIG. 22.

Transfer of the group of bobbins through the gates 105 and into the passing pockets on the feeder conveyor 47 is effected by straight pusher bars 196 (FIGS. 3, 7, 12, 21 and 22) of channel cross-section receiving and secured to ends of arms 197 fixed to a rockshaft 198 on the frame 59. The advance and retraction of the pushers to the transfer position shown in FIG. 23 and the retracted position (FIGS. 21 and 22) takes place rapidly and during a very short advance of the conveyor pockets 46. The pushers dwell in the retracted position as indicated at 199 (FIG. 39) for the major portion of the camshaft revolution. In its advance, each bar engages the bobbin progressively along its length and pushes it laterally forcing the gate 105 open and then pushing the bobbin on and into the open side of the passing pocket as shown in FIG. 23 and indicated at 201. The pusher bars are retracted out of the pockets at 202 before trailing sides 195 of the pockets 46 reach the plane of swinging of the bar.

Rocking of the shaft and the pushers occurs in each revolution of the camshaft 79 and is effected by a cam 203 (FIG. 6) fast thereon and acting on a follower 204 on one end of a bell-crank lever 205 on the rockshaft 114 with its other arm joined by a link 206 to an arm 207 on the pusher shaft 198. A spring 208 holds the follower against the cam. The bobbins thus transferred to the conveyor pockets 46 and accurately spaced by being urged by gravity into the converging bottoms thereof are supported on the track 193 as they are carried around to the end 194 from which, as illustrated in FIG. 20, each bobbin drops endwise and downwardly when the lower end 88 of its core passes this end. The latter and the dropping point 48 are at the apex of the triangular feeder conveyor 47 opposite the base of the triangle onto which the groups of bobbins are transferred. The dropping point is disposed above the path traversed by the bobbin holders 38 on the spooler conveyor 41 and determines accurately the time at which each transferred bobbin will be dropped after the magnet 157 is energized to indicate the need for refilling a certain succession of empty holders on the spooler conveyor and start a bobbin elevating cycle.

*Spooler conveyor cars*

The cars 39 attached to the chain 49 above described to form the spooler conveyor 41 are of substantial length, about five inches in the present instance and comprise a rigid frame 211 carrying spaced horizontally projecting studs 212 along the conveyor path and carrying rollers 213 which ride along an upwardly opening groove defined by the lower flange 214 of channel bars 215 opening toward the cars and extending at least along the parallel sides of the conveyor. Spaced along the conveyor and rigid with the spooler and conveyor frames are uprights 216 (FIG. 3) to which the channel bars are bolted or otherwise fixed. Above the rollers 213, each car also carries rollers 217 journaled on upright studs and disposed within and guided by the squared upper flange 218 of the upper edge of the bar.

For a purpose to appear later, each car is coupled detachably to the chain above described. This is accomplished through the medium of two hooks 219 extending along the top and bottom of the chain 49 and at their trailing ends rigid with each other and pivotally connected by a pin 221 to the bifurcated end of a plate 222 (FIG. 33) which is disposed between the hooks and lies against one side of the chain, the bottom of which rests on a flange 223 of the plate 222. The ends of the hooks extend around and are held by springs 220 (FIG. 34a) seated against the projecting ends of one of the chain pintles 224 joining adjacent links of the chain. The car frame is thus yieldably connected to the chain, the notches 225 in the hooks being shallow enough to allow the pintle to cam the hooks inwardly and pass the latter if the car encounters an obstruction.

The bobbin holder 38 on each car comprises a tube 226 somewhat shorter but larger in diameter than a bobbin fixed to a transversely curved plate 227 whose lower end extends beyond the tube and is fixed to upright arms 228 bolted at 229 (FIG. 33) or otherwise secured to the top of the car. The tubes are inclined downwardly and inwardly at substantially the same angle as the pockets 46 of the feeder conveyor and are disposed relative to the conveyor 41 so as to substantially aline with one of the pockets 38 at the dropping point 48, as shown in FIG. 24.

In the bobbin holder tube 226, the lower end 88 of the bobbin core rests against a false bottom or gate 231 which is adapted to be withdrawn rapidly at an accurately defined time in the movement of the conveyor so that the bobbin will be deposited properly in the reserve pocket irrespective of the different angles at which the bobbin may be disposed in the holder 38. This is accomplished by latching the gate in closed position and releasing the same to spring action when the car reaches a predetermined position in alinement with the reserve pocket into which the bobbin is to be deposited. To these ends, the gate is fulcrumed on the car and held in closed position (FIG. 24) by a latch 232 which is tripped by a flag 233 mounted on one of the reserve pockets 29 of the spooler when the flag is in a position (FIG. 26) indicating that the reserve pocket being passed by the car is empty and needs refilling. The gate is spaced a short distance below the lower end of the tube and projects through a slot 234 in the extension 227. It comprises the laterally bent upper end of the elongated arm of an L-shaped lever 235 disposed in upright position between the car rollers 217. Below the chain 49 the lower end of the arm is bolted at 236 to the outer end of a channel-shaped member 237 (FIG. 32) which projects inwardly and horizontally and constitutes the short arm of the lever. Depending lugs on the end of this member receive and are pivotally connected by a pin 238 to lugs on the horizontal and inwardly extending portion of an arm 239 on the car frame 211 and disposed at about the level of the bottom of the spooler pockets 29. With the weight of the L-shaped gate lever disposed outside of the fulcrum 238, the gate 231 is urged clockwise and out of the closed position (FIG. 24) in which the gate is held releasably by the latch 232. The force for opening of the gate is augmented by compression springs 241 (FIGS. 27 and 28) acting between the gate arm 237 and the heads of bolts 242 supported by and upstanding from the arm 239 of the car frame 211.

*Release of bobbins from cars to reserve pockets*

The gate opening latch 232 is so constructed and mounted that it will be released by the motion of the spooler conveyor 41 instantaneously with the car positioned precisely relative to the empty reserve pocket 29 whose associated flag 233 trips the latch which is reset automatically by swinging of the gate back to closed position. For these purposes, the latch is swingably mounted on the horizontal arm 237 of the gate lever 235 and includes a trip lug 243 movable relative to the lever longitudinally of the conveyor path and disposed at the level of and for engagement with the flag 233 of a reserve pocket 29 when such flag is in blocking position (FIG. 32) indicating the empty condition of the pocket. Herein the latch is disposed beneath the gate lever arm 237 and takes the form of a lever extending transversely of the spooler conveyor 41 and fulcrumed intermediate its ends on this arm. The fulcrum is a sleeve 244 upstanding from the arm and forming a bearing for a stud 245 fixed at its lower end to the latch. The inner end of the latter is bent first upwardly through a slot 246 in the arm 237 and then laterally at right angles to form the trip lug 243.

A contractile spring 247 urges the latch clockwise and normally holds the latch in the active position shown in FIGS. 24, 27 and 32 determined by a stop formed by one end 248 of the slot 246. In this position, the outer end 249 of the latch is disposed above the upper end 251 of a lug 252 upstanding from the bottom plate 239 on the car 39 thus blocking the gate lever and holding the gate 231 in closed position (FIG. 24). As the latch is swung counterclockwise (FIGS. 25 and 32) from this active position, the latch end 249 moves off from the end 251 of the lug thus releasing the latch to allow the springs 241 to swing the gate open as shown in FIG. 26 and release the bobbin therein for downward sliding into the empty reserve pocket then opposite the holder 38. The outer end 249 of the latch 232 moves downwardly with the gate lever arm 235 during which movement, the end 249 of the latch is held by the spring 247 against the leading edge 253 of the lug which is steeply inclined and acts as a cam to continue the swinging of the latch independently of the flag 233 until, in the open position of the gate, the latch will be disposed in the position shown in phantom in FIG. 25 and in full in FIG. 26. The trip lug 243 on the latch is thus moved in an arcuate path far enough to be disposed out of line with the flag which initiated the tripping of the latch as well as the flags of other winding units whose reserve pockets may be empty.

Resetting of the latch 232 is effected automatically as an incident to reclosing the gate 231 by reverse swinging of the lever 235 to the closed position shown in FIG. 24. The advance of the spooler is utilized for this purpose through the medium of a cam 254 (FIGS. 4 and 28) secured to the conveyor guide channel 215 and having an inclined surface disposed in the path of a portion 255 of the gate levers 235 of successive cars just above the guide rollers 213 thereof. When a gate lever encounters and passes the plow, it is cammed outwardly to closed position. During the accompanying raising of the latch 232, the end 249 follows up and is held against the cam surface 253 and then rides onto the top of the lug 252 where this end is positioned by the spring 247 and the stop 248. The latch is thus reset and becomes effective to hold the gate closed after the car rides past the plow 254. As shown in FIG. 4, the plow 254 is located along the conveyor track between the empty car sensor 44 and the loading point 48.

The flag 233 associated with each reserve pocket of the spooler to control the release of the next passing bobbin is mounted on one side wall of the pocket for movement transversely of the path of the conveyor 41 and between an active or pocket-empty position (FIGS. 25, 26 and 32) in the paths of the trip lugs 243 of the filled cars and an inactive or pocket-filled position out of such path shown in full in FIG. 24 and in phantom in FIGS. 25 and 26. Herein the flag comprises a lug projecting outwardly from the upper end of an upwardly and outwardly inclined arm 256 whose lower U-shaped end 257 is nested in and pivotally connected through a pin 258 to the lower end of a bracket 259 having an arm 261 clamped by screws to the side wall of the pocket 29 first passed by the cars 39. A contractile spring 262 acting between the arm 256 and the bracket urges the flag counterclockwise as viewed in FIG. 26 toward the inactive position.

To insure that each flag 233 will engage the trip lug 243 of only one of the passing cars in spite of possible bouncing of the bobbin as it is delivered into the reserve pocket, the flag is held in active position by a latch 263 so that after release of the latch, the flag will be maintained inactive until the latch has been reset. Herein, the latch takes the form of a bell-crank lever having a U-shaped central portion 264 fulcrumed on a pin 265 supported by the bracket 259 below the lower end of the pocket and paralleling the flag arm pivot. One arm of the lever has a shank 266 projecting upwardly through a slot 267 in the lower part 269 of the front wall 31 of the pocket and carrying at its upper end and within the pocket an enlarged and flat portion 271 constituting a feeler movable against the bottom of the pocket (FIG. 24) under the weight of a bobbin delivered into the pocket from a passing conveyor car. A light contractile spring 272 (FIGS. 25, 26 and 29) disposed below the feeler fulcrum 265 acts between the bracket and an outwardly projecting short arm 273 of the latch lever to urge the latter clockwise to the active position shown in FIGS. 29 and 32. The feeler is forked to receive and straddle the shank of the skewer 27 when the latter is swung into the reserve pocket to pick up a bobbin resting therein on the feeler and transfer this bobbin to the active winding position.

In the upper or latching position of the feeler the outer edge 274 of a square lug 275 projecting laterally from the short arm 273 of the latch lever is adapted to seat against the bottom and one side of a right angular notch 276 disposed above the fulcrum 258 of the flag arm and near the fulcrumed end and in the upper edge of a projection 277 rigid with the flag arm 256. Such latching engagement occurs as shown in FIGS. 29 and 32 when the pocket 29 is empty and the projection 277 is disposed substantially horizontally with the flag arm in upright position. With the latch lug 275 thus engaging the side of the notch 276, the flag 233 is held against the action of the spring 262 in the path of the oncoming trip lugs 243 on the conveyor cars and thus is positioned to block such lug on the first filled car that passes, the latch 232 on such car being tripped to release the bobbin. Upon tripping of its latch 263, the flag 233 is moved quickly by the spring 262 to and remains in inactive position out of alinement with the trip lugs 243 of the oncoming filled cars.

This position of the flag incicates the empty condition of the reserve pocket which condition obtains until a bobbin is released from a passing car and gravitates downwardly into the pocket. The end of the core of such bobbin engages the feeler 271 which, under the weight of the bobbin, is swung downwardly against the bottom of the pocket as shown in FIG. 24. Such rocking of the feeler raises the lug 275 above the notch 276 thus releasing the flag arm for counterclockwise movement by its spring 262 in the inactive position shown in FIG. 26 in which the flag arm is stopped by engagement with the bracket 261. The flag 233 is thus moved transversely of the conveyor and held out of the path of the oncoming trip lugs 243 on the conveyor cars. In this retraction of the flag, the projection 277 on the flag arm is swung upwardly above the horizontal as shown in FIG. 24.

When, during operation of the spooler, the skewer 27 picks up the reserve bobbin and transfers the same into active winding position, the feeler 271 is freed and swings upwardly under the force of the spring 272, this motion being limited by engagement, as shown in FIG. 30, of the latch lug on the top of a projection 278 in which the notch 276 is formed. Thus, the flag remains inactive and does not indicate the empty condition of the reserve pocket.

The latch lever 263 is reset and the flag restored to blocking position by plow 279 (FIGS. 4 and 30) fixed on the spooler conveyor 41 in a position to engage and swing downwardly the projections 277 of those flag arms of empty reserve pockets which are out of blocking position. Herein the plow is fixed to one of several dummy cars 39ˣ which are on a length of the conveyor 41 which is disposed beneath the traveler 12. These cars are constructed the same as those above described except for omission of the bobbin holders 38. The cam has an inclined under surface 281 positioned to ride over the projections 277 of successive idle winding units 10 and depress those whose flag arms 256 are out of blocking position. In such depression, the flag arm is rocked clockwise to the position shown in FIG. 29 and the notch 276 is presented to the latch lug 275 which seats in the notch and becomes effective to hold the flag in blocking position. The cam passes idly over the horizontally disposed projections 277 of those winding units whose pockets 29 contain reserve bobbins, the flages 233 thereof remaining in inactive positions.

Summarizing now the coaction of the flags 233 and trip lugs 243 in causing a bobbin 42 from a holder 38 on one of the conveyor cars 39 to be released and delivered into an empty reserve pocket as such car comes opposite such pocket, the parts being positioned as shown in FIGS. 25 and 32 with the latches 232 and 263 holding the gate 231 closed and the flag 233 in blocking position. When the trip lug 243 of the gate latch encounters the flag, its motion is blocked temporarily so that in the continued advance of the conveyor, the latch 232 is swung counterclockwise as viewed in FIGS. 25 and 32 to move the latch end 249 off from the lug end 251 and thus release the gate lever 235 for movement by the springs 241 out from under the supported bobbin thus releasing the latter for gravitation down the guide 227 and into the reserve pocket. After the latch lever rides off from the lug 252, the inclined leading edge 253 of the latter becomes effective under the action of the springs to continue the swinging of the latch and thus carry the trip lug thereon to the out-of-the-way position shown in phantom in FIG. 25 in which the trip lug is out of line with the flags of subsequent winding units that may be in blocking positions.

In reaching the bottom of the reserve pocket, the released bobbin engages and swings the feeler 271 to release the latch 263 and allow the flag lever 256 to be swung by the spring 262 to inactive position (FIG. 24). Such latching and releasing of the flag insures that the flag will remain inactive after a bobbin is delivered to the reserve pocket and will not be affected by upward bouncing of the bobbin.

After the reserve bobbin is removed by the skewer, the flag latch of this empty pocket is reset by the traveling cam 279 the next time the latter is carried past the pocket by the spooler conveyor. In the case of the pockets containing a reserve bobbin, this cam passes idly over the follower projection 277 then latched downwardly in horizontal position with the flag retracted.

The latching of the gate 231 in closed position and release of the latch by advance of the conveyor 41 acting in conjunction with a flag 233 of a winding unit is an important feature in that it enables the bobbin to be released and dropped instantaneously and always at a precise time in the movement of the car with its holder 38 in proper alinement with the reserve pocket which is to receive the bobbin.

*Signaling need for reloading cars*

The signal above referred to for initiating operation of the bobbin elevating mechanism above described is given when the last of a succession of empty conveyor cars, five in the present instance, passes the predetermined point 45 (FIGS. 1 and 4) which is spaced from the point 48 of dropping bobbins from the feeder conveyor a distance 280 which corresponds precisely to the interval required for the elevator mechanism 40 and the feeder conveyor 47 to execute a cycle as above described and drop the group of elevated bobbins one by one into the holders 38 of these same cars as the latter pass the dropping point 48. With such precise timing due to the positive coupling of the elevator and feeder conveyor with the spooler conveyor 41, the first of the five empty pockets will reach the dropping point 48 and receive the first bobbin of the group which is dropped from the track end 194. The four other bobbins will be received in the four succeeding pockets as they pass the dropping point.

More particularly, the signal for energizing the cycle starting magnet 157 is given by the simultaneous closure of five switches 282 (FIGS. 35, 36, 37 and 40) spaced along the conveyor 41 to correspond to the spacing of the cars 39 and each arranged to be closed each time a part of each car indicative of the empty condition of the car comes into engagement with the movable element of the switch. In the present instance, this part comprises the inclined leading face 284 (FIGS. 32 and 35) of a follower finger 285 carried by each car and rigid with and projecting from the gate lever 235 at the junction of the upright and horizontal arms thereof. The finger is thus disposed in the position shown in full in FIG. 32 when there is a bobbin in the holder 38. Upon release of the bobbin by opening of the gate 231, the finger moves downwardly to the position shown in phantom and remains in this position, indicating the empty condition of the holder, until the gate lever encounters the stationary cam 254 (FIG. 4) as above described and is swung to and relatched in closed position.

To utilize the fingers 285 in this way, the casings of the switches 282 are secured to the bottom of an elongated two-part housing 286 (FIG. 35) which is disposed below the fingers and clamped to the side of a bar 287 supported through tightened pin and slot connections 288 to brackets 216 on the frame 11. The pin of each normally open switch is depressed by clockwise turning (FIG. 35) of a cam 291 on a rockshaft 292 projecting through and journaled in the housing and carrying an upright arm 293 whose upper end 294 is disposed in the plane of the car fingers 285. A torsion spring 295 coacting with a stop 296 holds the arm 293 yieldably in upright position with the end 294 disposed in the path of the inclines 284 on the fingers of those cars which are empty.

As the cam surface moving with an empty conveyor car in the direction indicated by the arrow in FIG. 35 encounters and passes the end 294 of the arm, the latter is rocked clockwise thus closing the switch 282. The arm 293 of each switch is actuated in this way by the finger of each empty passing car so that by spacing the five arms apart along the conveyor path the same distances as the cam surfaces 284 on adjacent cars, all five of the switches will be closed simultaneously when arms thereof are actuated by the fingers of five successive empty cars. The closure of these switches, which are connected in series as shown in FIG. 40 completes the circuit for energizing the solenoid 157 and initiating a bobbin elevating and transferring cycle. At this time, the empty cars producing this signal are disposed in the position 297 (FIG. 1) while the pockets 46 on the feeder conveyor 47 which are to receive the new groups of bobbins are disposed at 298. As the cycle controlled by the cams on the shaft 79 is executed, the bobbins in the first row in the tray are elevated and transferred to the feeder conveyor by the time the empty bobbins reach the position 299. The bobbins, now resting on the track 193, are moved around the latter, the first bobbin of the group arriving at and dropping off from the end 194 of the track just as the first holder 38 of the empty group arrives at the point. This bobbin is dropped into this holder and the remaining four bobbins drop off from the track into the four succeeding empty holders which will be disposed below and vertically alined with the bobbins at the time of dropping thereof.

After such refilling, the cars move on with the conveyor 41 and deposit their bobbins one by one in the first empty reserve pockets 29 of the spooler as above described. The actuation of the switches 282 as above described is repeated each time the fingers 285 of a succession of five empty bobbins comes into engagement with the switch arms 293.

The description above assumes that the bobbins to be loaded into the spooler pockets are of the same kind. Such bobbins can be handled in accordance with the present invention with one tray chute 89, one elevating and transfer mechanism 40, one feeder conveyor 47, one empty bobbin group sensor 44, and by making the trip lugs 243 on all of the cars 39 and the bobbin release flags 233 on all of the winding units 10 of the same shape and construction.

*Handling different kinds of bobbins*

As pointed out above, it is sometimes desirable for a spooler of the above character to handle bobbins with threads of different kinds, that is, colors or counts in which case different groups of the winding units 10 are assigned to the respective counts, the bobbins of which are selected by the spooler operator and deposited in the proper reserve pockets 29. All of such manual operations are eliminated in accordance with another aspect of the invention simply by adding another chute 89, bobbin elevating mechanism including a cycle starting solenoid, and an empty bobbin sensor, for each additional thread count to be accommodated and by modifying the relative positions of the flags 233 and trip lugs 243 to effect dropping, at the point 48, of the bobbins of the different counts selectively into the pockets of the winding units assigned to the respective counts. The feeder conveyor 47 is utilized to receive and stop the bobbins of the different counts irrespective of the number of the counts being handled. In the illustrated embodiment, two different kinds of bobbins 42 and 42$^a$ are handled by the spooler, the winding units 10 on the near side of the spooler frame as viewed in FIGS. 1 and 4 being assigned to handling the bobbins 42 in the manner described above while the remaining units 10$^a$ on the other side use the other bobbins 42$^a$. It will be apparent that the number of counts may be increased as desired by proper division and grouping of the spooler winding units and duplicating the mechanism now to be described.

The bobbins 42$^a$ of the second count are delivered in trays 37$^a$ to a chute 89$^a$ (FIGS. 1 and 5) disposed alongside the chute 89 for advancing the trays step by step to present the leading transverse row of bobbins to the fork 96$^a$ by which the rows are elevated along channels 95$^a$. Above the ledge 102, a pusher, duplicating the pusher 196 on the rockshaft 198, transfers the first row of bobbins 42$^a$ as a group through gates similar to the gates 105 and into the passing pockets 46 of the feeder conveyor 47. The fork 96$^a$, the tray back-up pusher 159$^a$ and the pushers for transferring the elevated bobbins onto the feeder conveyor are mounted and actuated by the crank 129 and the cams 135, 136, 164 and 203, the same as the fork 96, pusher 159 and pushers 196, the effective operation being initiated by energization of a solenoid 157$^a$. Thus, a group of pockets 46 on the feeder conveyor 47 will always be available to receive groups of the bobbins 42 or 42$^a$ irrespective of whether these groups are elevated and transferred in the same cycle of the cam shaft 79, in successive cycles, or in spaced cycles.

The solenoid 157$^a$ (FIG. 40) is energized in response to the simultaneous closure of the five switches 282$^a$ of an empty car sensor 44$^a$ (FIGS. 1 and 4) which duplicates the structure of the sensor 44 above described and is arranged at the end of the latter for actuation by five empty cars 39$^a$ on the conveyor 41. The position of these switches is correlated with the positions of the chute 89$^a$ and the bobbins 42$^a$ along the feeder conveyor 46, the arrangement being such that upon simultaneous closure of the five switches 282$^a$ by the five cars 39$^a$ indicated at 301 (FIGS. 1 and 4), the solenoid 157$^a$ will be closed and a bobbin elevating and transfer cycle as above described will be initiated with the pockets 46 which are to receive the bobins disposed at 302. Thus, by virture of the correlated spacing of trays 37$^a$ backwardly around the feeder conveyor 47 and the sensing device 44$^a$ backwardly around the spooler conveyor 41 from this point, the leading one of the empty cars 39$^a$ will arrive at the loading point 48 coincident with the dropping of the first of the bobbins 42$^a$ off from the ledge 194. Then, the succeeding holders 38$^a$ of the group of cars will receive the remaining bobbins as they are dropped successively off from the feeder conveyor 46 at the loading point.

Selective actuation of the switches of the sensors 44 and 44$^a$ by the empty cars 39 and 39$^a$ is achieved by constructing and positioning the follower fingers 285 on the cars 39 for engagement only with the arms 293 of the sensor 44 while the fingers 285$^a$ (FIGS. 26, 36 and 37) of the cars 39$^a$ are engageable only with the arms 293$^a$ of the sensor 44$^a$. This is acomplished simply by offsetting the fingers 285 and 285$^a$ transversely of the conveyor 41 and similarly offsetting the arms 293$^a$ of the sensor 44$^a$ as shown in FIGS. 36 and 37.

With this arrangement, the fingers 285 of the cars 39 are ineffective or disabled when passing the arms 293$^a$ of the sensor 44$^a$ while the fingers 285$^a$ of the cars 39$^a$ pass the arms 293 of the sensor 44 without engaging the latter. Such disabling by offsetting the fingers 285 and 285$^a$ and arms 293 and 293$^a$ of the different groups of cars and the sensors is preferred over the alternative of arranging the fingers and arms in the same plane and providing means such as a commutator actuated by the conveyor 41 to disable the sensor 44 when the cars 39$^a$ are passing and the sensor 44$^a$ when the cars 39 are passing.

When more than two kinds or counts of threads are to be handled by the spooler, the winding units are grouped accordingly and additional chutes 89$^b$ and 89$^c$ (FIG. 1) and elevating forks 96$^b$ and 96$^c$ (FIG. 5) and other associated transfer mechanisms are provided and arranged side by side and spaced along the feeder conveyor adjacent the chutes 89 and 89$^a$ above described. The cycles for these mechanisms are produced by sets of the same crank and cams on the shaft 79 and are initiated by the simultaneous closure of groups of switches 282$^b$ and 282$^c$ (FIG. 40) of sensors 44$^b$ and 44$^c$ (FIG. 1) spaced along the conveyor 41 as shown in FIG. 1 and correlated in their action with the positions of the groups of bobbins 42$^b$ and 42$^c$ in the trays 37$^b$ and 37$^c$ along the feeder conveyor 46. Simultaneous closure of the switches 282$^b$ by five successive empty cars 39$^b$ energizes a solenoid 157$^b$ to initiate elevation of the first five bobbins 42$^b$ from the tray 37$^b$, these bobbins being transferred into the pockets 46 of the feeder conveyor indicated at 303 (FIG. 1) and eventually dropped successively into the holders 38$^b$ as they reach the loading point 48. Similarly, closure of the five switches 282$^c$ energizes a solenoid 157$^c$ to initiate elevation of the first five bobbins 42$^c$ out of the tray 37$^c$, deliver these bobbins into the pockets 46, indicated at 304, of the feeder conveyor which eventually drops these bobbins into the five empty cars 39$^c$ which cause the solenoid to be energized.

Provision is made for releasing the bobbins 42 into empty pockets 29 of the winding units 10 only and the bobbins 42$^a$ only into the pockets 29$^a$ of the winding units 10$^a$. Such selective action is achieved by shaping and positioning the flags 233 of the winding units 10 for engagement only with the trip lugs 243 of the cars 39 and the flags 233$^a$ of the units 10$^a$ for engagement only with the trip lugs 243$^a$ on the cars 39$^a$. As shown in FIG. 31, the flag 233 and the trip lug 243 of the cars 39 are disposed at a level higher than flags 233$^a$ of the winding units 10$^a$ and the trip lugs 243$^a$ of the conveyor cars 39$^a$. The vertical spacing of the sets of coacting flags and lugs is such that the flags 233 are engageable only with the trip lugs 243 while the flags 33$^a$ are capable of blocking only the lugs 243$^a$ on the cars 39$^a$. It will be observed that this arrangement is facilitated by projecting the flags and the trip lugs transversely of the conveyor path and toward each other from the upright arms 256 and 232.

To adapt the present invention to spoolers adapted to handle bobbins with more than two thread counts, the flags 233$^b$ and 233$^c$ and the trip lugs 243$^b$ and 243$^c$ for such bobbins are disposed as shown in FIG. 31 at different levels from each other and from the flags 233 and 233$^a$ and trip lugs 243 and 243a above described. As a result, the bobbins 42, 42a, 42b, and 42c elevated and transferred into the conveyor cars 39, 39a, 39b and 39c will be released only into those reserve pockets 29 of the spooler which are assigned to the handling of the respective kinds of bobbins.

Overload release

While there is a danger but not often expected of one of the cars 39 jamming in its guideway or becoming blocked in the handling of the bobbins by the feeder and spooler conveyors, provision is made for taking care of this emergency in two ways. First each car is coupled releasably to the chain 49 as described above and through the medium of the hooks 219 which pull the car along the supporting track 215. Thus, if the advance of the car is blocked for any reason, the hooks are cammed against the spring 220 and out of the way by the chain pins 224 thus allowing the car to be stopped without being damaged. Succeeding cars would also be blocked and similarly disconnected from the chain.

Secondly an electrically operated system is provided for declutching or stopping the chain drive motor 61 and applying a suitable brake 305 (FIG. 40) in the event of interference with the advance of a car. It is for this purpose that each car is supported in the track 215 somewhat loosely through the pairs of rollers 213 and 217 as above described so as to allow the car to tilt slightly and transversely of the car guide track as shown in FIG. 34, such tilting being permitted by mounting the hooks 219 on the member 222 which is coupled to the car frame 211 through the pivot 222a (FIGS. 34 and 34a).

To sense such tilting of any one car, an insulated bus bar 306 (FIGS. 26, 34 and 40) is secured to the under side of the horizontal top flange 218 of the conveyor track 215 and an upstanding V-shaped lug 307 is secured to each car with its upper end 308 disposed between the car rollers 217. This end is spaced along the conveyor from the car pivot 222a and, when the car is in normal upright position, is close to but out of contact with the bus bar. But, if the car is tilted slightly as a result of blocking the advance or pushing forward at its upper end, the lug will engage the bus bar as shown in FIG. 34 and complete a circuit 310 (FIG. 40) to energize the relay 311 which opens the normally closed switch 312 in the holding circuit of the relay 68 thus deenergizing the relay to open the switches 67 and deenergize the traveler and chain drive motors 21 and 61. The circuit extends through the bus bar, the tilted car and the chain 46. The relay 311 is also used to close a switch 313 and energize the winding 305 of an electric brake for effecting quick stopping of the chain drive motor.

Simplified synchronizing of traveler and spooler conveyor movements

With the automatic bobbing loading mechanism above described, it is important that the traveler 12 be maintained at all times in the space 340 (FIG. 1) along the path 9 between the leading and trailing bobbin cars 39 on the conveyor 41. While this may be accomplished through the unit 66 above described, a simplification may be achieved arranging the drives by the motors 21 and 61 to move the traveler and the conveyor 41 at substantially equal speeds and controlling the starting and stopping of the traveler and conveyor by limit switches 320 and 321 (FIGS. 1 and 41) stationarily mounted on the spooler frame and respectively responsive to the movements of the traveler and the conveyor in traversing one of the vacant areas around the ends of the path 9 between the ends of the rows of winding units 10.

For this purpose, the speeds of the motors 21 and 61 and the ratios of the gear and belt drives to the traveler and the conveyor are correlated to drive the traveler and the conveyor at closely matched speeds and the switches 320 and 321 are arranged to reposition the conveyor and traveler relative to one another when they are substantially out of step while the traveler is moving around one of the ends of the path 9. To this end, the traveler drive motor is stopped and restarted by energization of a relay 322 controlling switches 323 in the circuit of the motor 21. A similarly acting relay 324 actuates switches 325 for stopping and restarting the conveyor drive motor 61.

The limit switches 320 and 321 are mounted stationarily along the vacant part of the path 9 of the traveler and arranged to be actuated by cams 326 and 327 (FIG. 1) fixed to the traveler and the dummy car 39x respectively and disposed in the same plane extending transversely of the path 9. Thus, the switch 320 is actuated by the cam 326 each time the traveler passes closing the contacts 320b and opening the contacts 320a of the limit switch 320. Similarly and as the dummy car passes, the limit switch 321 is actuated by the cam to close the contacts 321b and open the contacts 321a. The contacts of the two switches are interconnected as shown in FIG. 41 so that if the traveler and conveyor are properly in step as the cams pass and actuate the switches, the relays will remain energized through the contacts 320b and 321b while the cams are holding the switches 320a and 321a open, the control of the relays being transferred back to the contacts 320a and 321a as the cams move out of engagement with the limit switches. If the traveler is disposed ahead of the car 39x when its cam 326 actuates the switch 320, the relay 322 will be deenergized and the traveler stopped until the dummy car catches up with the traveler and actuates the switch 321 to reclose the relay circut through the switch 321b. Both motors are then energized to continue the advance of the traveler and conveyor.

If the conveyor 41 gets ahead of the traveler, the switch 321 will be actuated first by its cam 327 deenergizing the relay 324 to stop the motor 61 until the traveler catches up and both switches 320 and 321 become actuated to restart the conveyor motor through the contacts 320b and 321b. Then, as the cams pass by, the limit switches are returned to normal positions and both relays continue to be energized through the contacts 320a and 321a.

It will be apparent that the cams and limit switches come into action each time that the traveler and dummy car move around one end of the spooler frame and coact automatically if the traveler and conveyor are out of step to temporarily stop the drive motor of one part until the other part has caught up, operation of both motors then being resumed. In this way, the motions of the traveler and conveyor are properly synchronized by a simple limit switch arrangement.

Empty tray disposal

An extension 315 (FIG. 3) of the chute 89 is supported by opposite ends of the frame 59 and is adapted to receive successive trays 37 after all of the rows of bobbins therein have been removed as above described. The chute extension is an open frame through which the trailing end of an empty tray may drop onto a downwardly and reversely inclined chute 316 along which the tray descends to an unloading position beneath the chute 89.

I claim as my invention:
1. In a thread winding machine having a row of winding units arranged side by side, each having a reserve pocket for receiving a reserve supply bobbin, and a traveler movable along said row to service and restart the idle units successively in passing the same including transferring reserve bobbins out of the reserve pockets to winding positions, a machine for automatically loading new bobbins into the empty reserve pockets having, in combination, an endless horizontal conveyor extending along and movable past said winding units, a row of upwardly opening cars spaced along said conveyor and each adapted to receive and releasably support a bobbin in upright position and aline the bobbin with each of the successive reserve pockets the car passes, means asso- ciated with each of said reserve pockets and acting, when the pocket is empty, to release and receive the bobbin from the next filled car to reach such pocket, a device disposed in a predetermined location along the conveyor path and operable to sense the condition of each passing car and give a signal when a predetermined number of successive passing cars are empty, said empty cars being advanced by the conveyor and presented one by one past a loading position, a carrier supporting bobbins in a plurality of rows each containing said predetermined number of bobbins, means supporting said carrier for step by step advance to present the leading transverse row of bobbins to a pick-up position, mechanism operable in a cycle of fixed length to remove the row of bobbins in said pick-up position, transfer the same bodily to a position adjacent said loading position and deposit the bobbins one by one into the successive ones of said empty cars as the latter are presented to said loading position, and mechanism activated in response to said signal to control the advance of said carrier and drive said conveyor and said transfer mechanism in precise synchronism to exactly equalize the time length of said pick-up, transfer and loading of the first bobbin with the interval required for the first of said empty cars to reach said loading position in response to said signal.

2. A winder loading machine as defined in claim 1 in which said transfer mechanism includes a second endless conveyor movable in synchronism with said first conveyor and having pockets in which the bobbins being transferred are disposed in upright positions in being carried to said loading position.

3. A winder loading machine as defined in claim 2 in which said second conveyor travels in a path in the form of a polygon and said loading position is at one bend of the polygon and the bobbins in said pick-up position are spaced along a side of the polygon.

4. A winder loading machine as defined in claim 2 in which said second conveyor travels in a path in the form of a triangle and said loading position is at an apex of the triangle and the bobbins in said pick-up position are spaced along a side of the triangle opposite said apex.

5. A winder loading machine as defined in claim 1 in which each of said cars includes a member movable as an incident to release of a bobbin from the car to a position indicative of the empty condition of the car, and said sensing device includes a plurality of elements actuated by the passage of said members, and means responsive to the simultaneous actuation of said elements to give said signal for initiating one of said cycles.

6. A winder loading machine as defined in claim 5 including means operable automatically by the movement of said conveyor after the giving of said signal to restore said members successively to inactive positions.

7. A winder loading machine as defined in claim 5 in which said signaling elements comprise switches normally disposed in one position and moved to a different position by a passing empty car.

8. A winder loading machine as defined in claim 7 in which said switches are connected in series and said signal is given upon their simultaneous closure.

9. In a thread winding machine having a row of winding units arranged side by side, each having a reserve pocket for receiving a reserve supply bobbin, and a traveler movable along said row to service and restart the idle units successively in passing the same including transferring reserve bobbins to winding positions out of the reserve pockets, said winding units and the reserve pockets thereof being divided into first and second groups for handling first and second kinds of bobbins, a machine for automatically loading new bobbins of said first and second kinds respectively into empty reserve pockets of the said first and second groups having, in combination, an endless horizontal conveyor extending along and movable past said winding units, a row of first and second groups of upwardly opening cars spaced along said conveyor and respectively adapted to receive and releasably support said first and second kinds of bobbins in upright position and aline each bobbin with each of the successive reserve pockets as the car passes by, means associated with each reserve pocket of said first group and acting, when the pocket is empty to release and receive the bobbin from the next filled first car to pass such pocket, a device disposed in a predetermined location along the conveyor path and operable to sense the condition of the passing cars of the first group and give a signal when a predetermined small number of succesive cars of such group are empty, such empty cars being moved by the conveyor and presented one by one past a loading position, a carrier supporting bobbins of said first kind in a plurality of rows each containing said predetermined number of bobbins, means supporting said carrier for step by step advance to present the leading row of bobbins in a pick-up position, transfer mechanism operable in response to said signal and in a first cycle of fixed length to engage and remove the row of first bobbins in said pick-up position, transfer the same to said loading position and deposit such bobbins one by one into the successive ones of said first empty cars as the latter are presented to said loading position, mechanism driving said conveyor and said transfer mechanism in synchronism to exactly equalize the time length of said pick-up. transfer and loading of the first bobbin of said first kind with the time interval required for the first of said empty cars of said first group to reach said loading position after the giving of said signal, a second sensing device disposed at a second location along the conveyor path and operable to give a second signal when a predetermined second number of successive ones of passing cars of said second group are empty, a second carrier supporting said second kind of bobbins in a plurality of rows each containing said second predetermined number of second bobbins, means supporting said second carrier for step by step advance to present the leading row of bobbins thereon in a second pick-up position, a second transfer mechanism operable in response to said second signal and in a second cycle of fixed length to engage and remove a row of said second bobbins from said second pick-up position, transfer the same to said loading position and deposit such bobbins one by one into successive ones of said second empty cars as the latter pass such position, said second transfer mechanism being responsive to said second signal and actuated in synchronism with the motion of said conveyor so as to exactly equalize the time of the pick-up, transfer and loading of the first bobbin of said second kind with the interval required for the first of said empty cars of said second group to reach said loading position after the giving of said second signal.

10. A winder loading machine as defined in claim 9 in which the first and second transfer cycles are of different lengths and correspond respectively to the spacing of said first and second sensing devices along said conveyor from said loading position.

11. A winder loading machine as defined in claim 9 in which said first and second bobbin transfer mechanisms include an endless feeder conveyor receiving groups of said first and second bobbins removed from said carriers and delivering the same one by one past said loading point.

12. A winder loading machine as defined in claim 11 in which said feeder conveyor travels a path in the form of a polygon, said first and second carriers being disposed side by side along a side of the polygon spaced around the path from said loading position.

13. A winder loading machine as defined in claim 12 in which said loading point is at a bend of said polygon spaced around the latter from first and second carriers.

14. A winder loading machine as defined in claim 11 in which said first and second sensing devices are spaced along said first conveyor from said loading position proportionate distances respectively corresponding to the spacing of said first and second carriers along said feeder conveyor from said loading position so that the first empty car arrives at the loading position precisely at the time that the first bobbin of the group being transferred is released at the loading position.

15. In a thread winding machine having a row of winding units arranged side by side, each having a reserve pocket for receiving a reserve supply bobbin, and a traveler movable along said row to service and restart the idle units successively in passing the same including transferring reserve bobbins to winding positions out of the reserve pockets, said winding units and the reserve pockets thereof being divided into first and second groups for handling first and second kinds of bobbins, a machine for automatically loading new bobbins of said first and second kinds respectively into the empty reserve pockets of the said first and second groups having, in combination, and endless horizontal conveyor extending along and movable past said winding units, a row of first and second groups of upwardly opening cars spaced along said conveyor and respectively adapted to receive and releasably support said first and second kinds of bobbins in upright position and aline the bobbin with each of the successive reserve pockets as the car passes by, means associated with each reserve pocket of said first group and acting, when the pocket is empty to release and receive the bobbin from the next filled first car to pass such pocket, similar means acting to release the second bobbins from said second cars into successive empty pockets of said second group, the empty cars on said conveyor moving past a loading position, first and second carriers supporting groups of said first and second bobbins in transverse rows of a predetermined number of bobbins, transfer mechanism operable selectively and automatically to engage and pick up the first row of bobbins in said first and second carriers, deliver such bobbins in upright positions to said loading position and drop the same endwise one by one into the passing conveyor cars, a first device spaced backwardly along said conveyor from said loading position and operable to sense the condition of each passing car of said first group and give a first signal when a number of successive passing cars of such group are empty, such number being equal to the bobbins in said carrier rows, a similar second device spaced along said conveyor a different distance from said loading position and operable to sense the passage of a similar succession of passing empty cars of said second group and give a similar second signal, and mechanism responsive to said first and second signals to initiate operation of said transfer mechanism to selectively transfer a row of bobbins to said loading position from the corresponding one of said carriers, the spacing of said first and second devices from said loading position corresponding to the intervals required for the first of the picked-up bobbins of each group to reach the loading position whereby the empty cars producing a signal will arrive at the loading position coincident with the arrival of the successive bobbins whose transfer is initiated by such signal.

16. In a thread winding machine having a row of winding units arranged side by side, each having a reserve pocket for receiving a reserve supply bobbin, and a traveler movable along said row to service and restart the idle units successively in passing the same including transferring reserve bobbins to winding positions out of the reserve pockets, said winding units and the reserve pockets thereof being divided into first and second groups for handling first and second kinds of bobbins, a machine for automatically loading new bobbins of said first and second kinds respectively into the empty reserve pockets of the said first and second groups having, in combination, an endless horizontal conveyor extending along and movable past said winding units, a row of first and second groups of upwardly opening cars spaced along said conveyor and respectively adapted to receive and releasably support said first and second kinds of bobbins in upright position and aline each bobbin with each of the successive reserve pockets as the car passes by, means providing sources of supply of said first and second kinds of bobbins, first and second devices spaced backwardly along said conveyor from said loading position and respectively operable to sense the condition of passing cars of said first and second groups and give first and second signals respectively when predetermined successions of cars of said first and second groups are empty, and mechanism automatically responsive to said first and second signals and operable automatically to deliver bobbins of said first kind from said supply source one by one to the successive empty cars of said first group producing the first signal as such cars pass a predetermined loading position and similarly deliver bobbins of said second kind one by one to the successive empty cars of said second group producing the second signal as such cars pass said loading position.

17. In a thread winding machine having a row of winding units arranged side by side, each having a reserve pocket for receiving a reserve supply bobbin, and a traveler movable along said row to service and restart the idle units successively in passing the same including transferring reserve bobbins to winding postions out of the reserve pockets, said winding units and the reserve pockets thereof being divided into first and second groups for handling first and second kinds of bobbins, a machine for automatically loading new bobbins of said first and second kinds respectively into the empty reserve pockets of the said first and second groups having, in combination, an endless horizontal conveyor extending along and movable past said winding units, a row of first and second groups of upwardly opening cars spaced along said conveyor and respectively adapted to receive and releasably support said first and second kinds of bobbins in upright position and aline each bobbin with each of the successive reserve pockets as the car passes by, mechanism located around the path of said conveyor from said winding units for loading bobbins of said first kind into cars of said first group and bobbins of said second kind into cars of said second group, means associated with each of the reserve pockets of said first units and acting, when a car of said first group with a first kind of bobbin therein passes the pocket when the latter is empty, to release the bobbin and cause its transfer into such pocket, such means remaining inactive with respect to the passing of each car of said second group, and similar means associated with each reserve pocket of said second units and acting, when one of the cars of said second group with a second kind of bobbin therein passes the pocket when the latter is empty, to release such bobbin and cause its transfer into the pocket, such means remaining inactive with respect to the passing of each of the cars of said first group.

18. In a thread winding machine having a row of winding units arranged side by side, each having a reserve pocket for receiving a reserve supply bobbin, and a traveler movable along said row to service and restart the idle units successively in passing the same including transferring reserve bobbins to winding positions out of the reserve pockets, said winding units and the reserve pockets thereof being divided into first and second groups for handling first and second kinds of bobbins, a machine for automatically loading new bobbins of said first and second kinds respectively into the empty reserve pockets of said first and second groups having, in combination, and endless horizontal conveyor extending along and movable past said winding units, a row of first and second groups of upwardly opening cars spaced along said conveyor and respectively adapted to receive and releasably support said first and second kinds of bobbins in upright position and aline each bobbin with each of the successive reserve pockets as the car passes by, mechanism located around the path of said conveyor from said winding units for loading bobbins of said first kind into empty cars of said first group and bobbins of said second kind into empty cars of said second group, and elements on each of said cars and said winding units coacting selectively during movement of said cars past said reserve pockets to release bobbins of the first kind only from the successive filled cars of said first group into the empty reserve pockets of the successive first units and similarly release bobbins of said second kind only from the successive filled cars of said second group into the empty second reserve pockets.

19. A winder loading machine as defined in claim 18 in which the coacting release elements for said first and second kinds of bobbins are disposed at different levels so that the car element on a car of said first group passes the pocket element of said second units without active engagement and the car element on the cars of said second group similarly passes the pocket element of said first units.

20. In combination with a thread winding machine having in combination a row of winding units, each including a reserve pocket for receiving a reserve supply bobbin, and a traveler movable along said row to service and restart the idle units including transferring reserve bobbins to winding positions out of reserve pockets, an endless horizontal conveyor extending along and movable past said winding units, cars spaced along said conveyor for carrying reserve bobbins, means automatically responsive to the empty condition of each reserve pocket to cause a bobbin on a passing car to be transferred into such pocket, and mechanism for sensing the condition of the cars passing a predetermined point along the path of travel of said conveyor and operating automatically to signal the movement past said point of a predetermined number of successive empty cars.

21. In combination with a thread winding machine having, in combination, a row of winding units, each including a reserve pocket for receiving a reserve supply bobbin, and a traveler movable along said row to service and restart the idle units including transferring reserve bobbins to winding positions out of reserve pockets, an endless horizontal conveyor extending along and movable past said winding units, cars spaced along said conveyor for carrying reserve bobbins, means automatically responsive to the empty condition of each reserve pocket to cause a bobbin on a passing car to be transferred into such pocket, mechanism for sensing the condition of the cars passing a predetermined point along the path of travel of said conveyor and operating automatically to signal the movement past said point of a predetermined number of successive empty cars, comprising members carried by and spaced along said conveyor in accordance with the spacing of said cars thereon, each member being movable between a normal inactive position and an active position indicating the empty condition of the corresponding car, means spaced along the path of said conveyor according to the spacing of said members and adapted for engagement by the passing members when in said active position, and means for sensing the simultaneous engagement of said last mentioned means and said active members and giving a signal indicative of the empty condition of said predetermined number of successive cars.

22. A winder loading machine as defined in claim 21 in which each of said members is arranged to actuate a switch cooperating with the switches of the other members to change the condition of a control circuit in response to the movement of said predetermined number of empty cars past said point.

23. In a thread winding machine having a row of winding units arranged side by side, each having a reserve pocket for receiving a reserve supply bobbin, and a traveler movable along said row to service and restart the idle units successively in passing the same including transferring reserve bobbins to winding positions out of the reserve pockets, a machine for automatically loading new bobbins into the empty reserve pockets of the spooler having, in combination, an endless horizontal conveyor extending along and movable past said winding units, a row of upwardly opening cars spaced along said conveyor and each including a holder adapted to receive and support a bobbin in upright position and having a bottom gate movable between closed and open positions, means biasing said gate toward open position, a latch on said gate operable to hold the gate releasably in closed position, and a member on each of said reserve pockets movable between active and inactive positions respectively indicative of the absence and presence of bobbins therein, each of said members when in active position with one of said holders alined with the reserve pocket being engageable with a passing one of said latches in gate-closed position and operable in the further movement of said conveyor to move the latch relative to its supporting car and allow said gate to move quickly to open position by said biasing means.

24. A winder loading machine as defined in claim 23 in which said members are movable transversely of the path of said conveyor into and out of blocking relation with respect to the car latches and each latch comprises a lever mounted on the car to be swung horizontally out of latched position when engaged by one of said members.

25. A winder loading machine as defined in claim 24 including means operated by the movement of said gate after tripping of said latch to swing said lever out of alinement with the other of said members.

26. A winder loading machine as defined in claim 25 including means operating in the movement of said conveyor following release of a bobbin from one of said cars and movement of the car past the winding units of said row to return the gate to closed pisition.

27. A winder loading machine as defined in claim 24 in which said latch lever is fulcrumed intermediate its ends and one end coacts with said blocking members while the other is engageable with an upwardly facing abutment on said car and moves off from such abutment in the releasing movement of the lever, said latch lever moving transversely of the path of said conveyor in the opening of said gate.

28. A winder loading machine as defined in claim 27 in which said abutment is the upper end of a lug having a side edge inclined relative to the vertical and acting as a cam on said latch lever to effect further swinging thereof in the opening of said gate after the lever passes the abutment.

29. A winder loading machine as defined in claim 24 in which said gate is a lateral projection on an upright lever having a parallel projection at its lower end fulcrumed on the car so that the major weight of gate lever overhangs the fulcrum and the lower projection swings downwardly during the opening of the gate.

30. A winder loading machine as defined in claim 29 in which said gate lever fulcrum is on said lower projection.

31. A winder loading machine as defined in claim 23 in which said members are movable transversely of the path of movement of said conveyor between said active and inactive positions and in the active position block the advance of a part of said latch and thereby trip the latch.

32. A winder loading machine as defined in claim 31 in which each of said members is held in said inactive position by a feeler disposed in the reserve pocket, biased upwardly, and swingable under the weight of the bobbin delivered into the pocket.

33. A winder loading machine as defined in claim 32 in which said member is biased toward said active position and said feeler constitutes a latch engageable with said member to hold the same releasably in inactive position.

34. A winder loading machine as defined in claim 33 including means movable with said conveyor and operable on the members in inactive positions to swing such members to effect resetting of the feeler latch.

35. In a bobbin handling machine, the combination of, a downwardly inclined chute, a carrier disposed in said chute for downward gravitation and having upwardly opening recesses supporting bobbins in a plurality of rows extending transversely and also longitudinally of said chute, a stop engageable with the leading row of bobbins in said carrier to limit the downward movement of the carrier, said carrier having slots extending longitudinally of said chute and disposed below the bobbins in the respective longitudinal rows, said slots being open at their leading ends and opening upwardly through said carrier and said recesses, and means for elevating the leading transverse row of bobbins in said unloading position out of said carrier comprising a fork having fingers slidable along said slots below said bobbins, and mechanism for moving said fork to advance said fingers along said slots beneath the leading row of bobbins and then to raise and elevate such bobbins out of said carrier and past said stop.

36. The combination defined in claim 35 including means operable in timed relation to the movement of said fork and pushing said carrier backwardly and upwardly along the chute and said leading bobbins away from said stop before the upward movement of said fork.

37. In a bobbin handling machine, the combination of, a carrier having upwardly opening recesses supporting a plurality of bobbins in upright positions and in a plurality of rows extending transversely and also longitudinally of the carrier, means including a conveyor supporting said carrier substantially horizontally and biasing the same endwise, stop means controlling the step by step advance of said carrier under the biasing force to present the leading transverse row of bobbins in the carrier to a predetermined unloading position in the successive advances of the carrier, slots extending longitudinally of said carrier and below the bobbins in the respective longitudinal rows, said slots being open at their leading ends and opening upwardly in parallel upright planes through said carrier and said recesses, means for elevating the bobbins in said unloading position out of said carrier comprising a fork having fingers movable upwardly and downwardly in the vertical planes of said slots, and means for raising and lowering said fork and the fingers thereof from and to a position below the level of the bottoms of the bobbins in said unloading position.

38. In a bobbin handling machine, the combination of, a carrier having upwardly opening recesses supporting a plurality of bobbins in upright positions and in a plurality of rows extending transversely and also longitudinally of the carrier, means including a conveyor supporting said carrier substantially horizontally, means by which said carrier is indexed step by step to present the leading transverse row of bobbins to a predetermined unloading position in the successive advances of the carrier, slots extending longitudinally of said carrier and below the bobbins in the respective longitudinal rows, said slots being opened at their leading ends and opening upwardly in parallel upright planes through said carrier and said recesses, means for elevating the bobbins in said unloading position out of said carrier comprising a fork having fingers movable upwardly and downwardly in the upright planes of said slots, and means for raising and lowering said fork.

39. A bobbin handling machine as defined in claim 38 in which said conveyor is a stationary chute along which said carrier slides endwise.

40. A bobbin handling machine as defined in claim 39 in which said chute is inclined downwardly to derive the biasing force for advancing said carrier toward said unloading position.

41. A bobbin handling machine as defined in claim 38 in which the bobbins as supported by said carrier in said unloading position are tipped forwardly from the vertical at a small angle.

42. A bobbin handling machine as defined in claim 38 in which the fingers of said fork are on a shank disposed above the top of said carrier in the lowered position of the fork and said fingers are inclined downwardly to positions below the lower ends of the bobbins in said unloading position so as to permit the emptied leading portion of said carrier to pass beneath said fork shank.

43. In a bobbin handling machine, the combination of, a plurality of upright channels wider than the diameter of the bobbins to be handled disposed side by side and inclined upwardly and forwardly, mechanism including a carrier for supporting bobbins in a plurality of transverse rows and advancing the carrier step by step to dispose the bobbins of the leading row in the lower ends of the respective channels, said carrier being inclined to cause forward tipping of the leading bobbins into said channels, a generally horizontal ledge projecting forwardly from the upper ends of said channels, the bottoms of said channels and said ledge being formed with parallel upright slots, a fork having fingers in the planes of said slots and mounted for movement in an upright orbital path to engage the lower ends of said leading bobbins, slide the same upwardly along said channels and finally draw the ends forwardly along said ledge.

44. The combination defined in claim 43 in which the ends of said fork fingers are formed with upstanding lugs engageable with the lower ends of the bobbins to hold the latter in said channels during elevation and to draw the bobbin ends across said ledge when the bobbins have been raised above the ledge.

45. The combination defined in claim 44 in which said lugs in the lowered and advanced position of said fork are alined with the lower ends of the bobbin cores and enter the latter to hold the bobbins in said channels during elevation along the latter.

46. In a bobbin handling machine, the combination of, a plurality of upright channels wider than the diameter of the bobbins to be handled disposed side by side and inclined upwardly and forwardly, mechanism including a carrier for supporting bobbins in a plurality of transverse rows and advancing the carrier step by step to dispose the bobbins of the leading row in the lower ends of the respective channels, said carrier being inclined to cause forward tipping of the leading bobbins into said channels, a generally horizontal ledge projecting forwardly from the upper ends of said channels, the bottoms of said channels and said ledge being formed with parallel upright slots, a fork having fingers in the planes of said slots and mounted for movement in an upright path to engage the lower ends of said leading bobbins, and slide the same upwardly along said channels and onto said ledge.

47. The combination as defined in claim 46 including laterally spaced pockets upstanding from said ledge and spaced from the upper ends of said channel in position to receive said bobbins as the latter tip forwardly when elevated to the ledge, said pockets being inclined upwardly and forwardly to locate the bobbins in parallel and upright relation.

48. In a bobbin handling machine, the combination of, a generally horizontal ledge, a plurality of channels upstanding from the ledge near one edge thereof and opening toward the opposite edge of the ledge, said channels being inclined relative to the ledge upwardly and away from said other edge, and means for elevating a row of substantially upright and parallel bobbins upwardly onto said ledge and shift the bobbins across the ledge and into said channels.

49. The combination defined in claim 48 in which the backs of said channels are defined by gates biased to closed position, and said shifting means includes a pusher engageable with bobbins in said channels and operable to move the same broadwise to open said gates and push the bobbins therethrough.

50. The combination defined in claim 49 in which said gates each comprise two rectangular plates hinged along the side walls of said channels and spring urged in directions to dispose their free edges adjacent each other near the centers of the channels.

51. The combination defined in claim 50 in which said plates are inclined to converge at the back sides of said channels and thereby center the supported bobbins in spaced parallel relation.

52. The combination defined in claim 49 including an endless horizontal conveyor having upright and inwardly inclined and outwardly opening pockets laterally spaced to correspond to the spacing of said channels and disposed at substantially the level of said ledge, said pockets moving past and adjacent said channels for receiving bobbins pushed out of the latter, and means driving said conveyor in synchronism with said pusher so as to dispose a plurality of said pockets opposite the respective gates at the time that a group of bobbins is moved therethrough by the pusher.

53. In a thread winding machine having a row of winding units arranged side by side, each having a reserve pocket for receiving a reserve supply bobbin, and a traveler movable along said row to service and restart the idle units successively in passing the same including transferring reserve bobbins to winding positions out of the reserve pockets, a machine for automatically loading new bobbins into the empty reserve pockets including a horizontal track extending along and past said winding units, an endless horizontal chain extending along said track and movable past said winding units, a row of upwardly opening cars propelled by and uniformly spaced along said chain and each adapted to receive and releasably support a bobbin in upright position and aline the bobbin with each of the successive reserve pockets the car passes, and means normally coupling each of said cars to said chain but adapted when an obstruction is encountered by the car to yield and disconnect the car from the chain.

54. In a thread winding machine having a row of winding units arranged side by side, each having a reserve pocket for receiving a reserve supply bobbin, and a traveler movable along said row to service and restart the idle units successively in passing the same including transferring reserve bobbins to winding positions out of reserve pockets, a machine for automatically loading new bobbins into the empty reserve pockets of the spooler including a horizontal track extending along and past said winding units, an endless horizontal chain extending along said track and movable past said winding units, a row of upwardly opening cars propelled by and uniformly spaced along said chain and each adapted to receive and releasably support a bobbin in upright position and aline the bobbin with each of the successive reserve pockets the car passes, means normally coupling each of said cars to said chain, a guide supporting said chain and cars while permitting a small degree of movement of each car transversely relative to the guide, a power actuator for driving said chain, and means responsive to said lateral movement of any one of said cars to interrupt the drive by said actuator.

55. In a bobbin loading machine as defined in claim 54 in which said last mentioned means includes an elongated and insulated bus bar stationarily mounted and extending along the path traversed by said cars.

56. A carrier for bobbins each having a mass of thread wound thereon above the butt of a central core, said carrier comprising a rigid body having upwardly opening cups laterally spaced apart with axes disposed in a common upright plane and being adapted to receive bobbins dropped endwise therein, to engage the butt and thread mass of such bobbins and support the bobbins in substantially upright positions, and an upwardly opening slot extending upwardly through all of said cups, the bottom of said slot being spaced below the butts of the bobbins in said cups and the slot opening horizontally at the end of said carrier whereby to permit the endwise insertion of a lifting member into said slot and beneath successive terminal bobbins in said row and by upright movement to elevate the terminal bobbin out of the cup.

57. For use with bobbins each having a thread mass tapered to the bobbin butt, a bobbin carrier as defined in claim 56 in which the butts of said bobbins are seated and centered in the bottoms of said cups and the tapers of the thread masses are engaged by the walls of said cup to hold the bobbins in upright positions.

58. A bobbin carrier as defined in claim 56 including a plurality of additional rows of cups on said body like those of said first mentioned row arranged in rows paralleling each other and the first row with the corresponding cups of all of the rows arranged in common transverse planes, and open ended slots like said first mentioned slots paralleling the latter and opening upwardly through the cups of said additional rows.

59. A bobbin carrier as defined in claim 56 in which the recesses of said cups depend from a top plate surrounded by a depending peripheral skirt having side walls rigidly joined below the bottoms of said cups, with said slot opening through the side wall at the end of said row.

60. In a bobbin handling machine, the combination of, a carrier having upwardly opening recesses supporting a plurality of bobbins in upright positions and in a plurality of rows extending transversely and also longitudinally of the carrier, means supporting said carrier substantially horizontally and indexing the same endwise step by step to present the leading transverse row of bobbins to a predetermined unloading position, slots extending longitudinally of said carrier and below the bobbins in the respective longitudinal rows, said slots opening at their leading ends along the path of the tray advance and opening upwardly through said carrier and said recesses, and means movable upwardly through the slots of the recesses supporting the bobbins in said unloading position to elevate such bobbins out of said carrier.

61. A bobbin handling machine as defined in claim 60 including upright parallel channels opening toward the bobbins in said unloading position and receiving and guiding the same during and after elevation of the same out of said carrier.

62. A bobbin handling machine as defined in claim 61 in which the lower ends of said channels are disposed above the path of advance of said carrier whereby to permit carrier to move under channels and said elevating means to engage the lower ends of the bobbins of each leading row indexed to said unloading position.

References Cited

UNITED STATES PATENTS

| | | | |
|---|---|---|---|
| 2,350,927 | 6/1944 | Reiners et al. | 242—35.5 |
| 2,600,793 | 6/1952 | Molloy | 242—35.5 |
| 2,665,854 | 1/1954 | Siegenthaler | 242—35.5 |
| 2,707,546 | 5/1955 | Furst | 242—35.5 X |
| 2,733,014 | 1/1956 | Hallman | 242—35.5 X |
| 2,846,833 | 8/1958 | Snow | 53—160 |
| 3,111,280 | 11/1963 | Reiners et al. | 242—35.5 |
| 3,224,694 | 12/1965 | Isao Oishi | 242—35.5 |
| 3,279,710 | 10/1966 | Raasch | 242—35.5 |

FOREIGN PATENTS

| | | |
|---|---|---|
| 235,680 | 10/1961 | Australia. |
| 385,573 | 3/1931 | Great Britain. |
| 360,629 | 4/1962 | Switzerland. |

STANLEY N. GILREATH, *Primary Examiner.*